US008112031B2

(12) United States Patent
Shiomi et al.

(10) Patent No.: US 8,112,031 B2
(45) Date of Patent: Feb. 7, 2012

(54) INFORMATION PROCESSING APPARATUS

(75) Inventors: Takuro Shiomi, Tokyo (JP); Takashi Ichinose, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 507 days.

(21) Appl. No.: 12/329,050

(22) Filed: Dec. 5, 2008

(65) Prior Publication Data
US 2009/0149215 A1 Jun. 11, 2009

(30) Foreign Application Priority Data
Dec. 7, 2007 (JP) ................................ P2007-317088

(51) Int. Cl.
*H04H 40/00* (2008.01)
(52) U.S. Cl. ................ 455/3.06; 455/556.1; 348/14.06; 725/62
(58) Field of Classification Search ................ 455/3.06, 455/556.1; 348/14.06; 725/62
See application file for complete search history.

(56) References Cited

U.S. PATENT DOCUMENTS

| | | | | |
|---|---|---|---|---|
| 6,519,011 B1 * | 2/2003 | Shendar | ............... | 348/731 |
| 7,466,367 B2 * | 12/2008 | DaCosta | ............... | 348/730 |
| 7,493,079 B2 * | 2/2009 | Koizume et al. | ........ | 455/3.06 |
| 7,913,284 B2 * | 3/2011 | Abrant et al. | ............ | 725/116 |

FOREIGN PATENT DOCUMENTS

| | | |
|---|---|---|
| JP | 03-001727 A | 1/1991 |
| JP | 09-119993 A | 5/1997 |
| JP | 2004-289611 A | 10/2004 |
| JP | 2007-036616 A | 2/2007 |

OTHER PUBLICATIONS

Office Action dated Nov. 1, 2011 as received in related Application No. JP 2007-317088.

* cited by examiner

*Primary Examiner* — Kenneth B. Wells
(74) *Attorney, Agent, or Firm* — Maschoff Gilmore & Israelsen

(57) ABSTRACT

A view recording processing unit performs a view recording processing of a broadcast wave from a broadcast station. By using a clock circuit, at the timer view time or timer recording time, a timer view recording activation request generation unit generates an activation request for activating the view recording processing unit. On the basis of the activation request, the timer view recording activation unit activates a view recording unit at the timer view time or timer recording time. A view recording activation factor determination unit determines whether an activation factor is derived from the activation caused by the timer view recording activation unit. In a case where the activation factor is derived from the activation caused by the timer view recording activation unit, the view recording processing unit uses a timer view recording purpose audio volume value to perform the view recording processing of the broadcast wave.

20 Claims, 19 Drawing Sheets

| STEP | TIMER VIEW RECORDING PURPOSE AUDIO VOLUME VALUE |
|---|---|
| STEP 1 | AUDIO VOLUME VALUE IN 11TH STAGE OUT OF 21 STAGES |
| STEP 2 | AUDIO VOLUME VALUE IN 13TH STAGE OUT OF 21 STAGES |
| STEP 3 | AUDIO VOLUME VALUE IN 15TH STAGE OUT OF 21 STAGES |
| STEP 4 | AUDIO VOLUME VALUE IN 17TH STAGE OUT OF 21 STAGES |
| STEP 5 | AUDIO VOLUME VALUE IN 19TH STAGE OUT OF 21 STAGES |
| STEP 6 | AUDIO VOLUME VALUE IN 21TH STAGE OUT OF 21 STAGES |

FIG. 13

INFORMATION PROCESSING APPARATUS

BACKGROUND OF THE INVENTION

1. Field of the Invention

The present invention relates to an information processing apparatus. In particular, the invention relates to an information processing apparatus such as a cellular phone capable of receiving a terrestrial digital broadcast wave.

2. Description of the Related Art

In recent years, a cellular phone functioning as an information processing apparatus has been mounted with not only a communication function simply with a voice talk but also various functions including an address book function, a mail function through a network such as a base station or the Internet, and a browser function enabling a browsing of a Web page and the like as well as multimedia functions such as a music control function enabling a listening to audio data (music player function) and a function allowing to receive a terrestrial digital one-segment broadcast wave, a terrestrial digital radio broadcast wave, and an FM radio broadcast wave.

In particular, when the cellular phone receives the terrestrial digital one-segment broadcast wave, in recent years, a technology for automatically carrying out a timer recording of a broadcast program on a desired channel at a previously set timer recording time has been also proposed. According to Japanese Unexamined Patent Application Publication No. 2007-36616, as a technology related to this timer recording of the terrestrial digital one-segment broadcast wave, for example, a technology for suppressing discomfort feeling of a user or surroundings caused by an audio of the received program at the time of recording a timer-set program and reducing a wasteful power consumption has been proposed.

As being similar to this timer recording concept, a technology for automatically carrying out a timer activation of a broadcast program on a desired channel at a previously set timer activation time is also known.

In a case where the cellular phone records a program while receiving the terrestrial digital one-segment broadcast wave and the user views the terrestrial digital one-segment broadcast wave received by the cellular phone, in general, a television audio volume at the time of the view or recording performed immediately before is stored in a storage unit (memory). Once again when an application program related to the terrestrial digital one-segment broadcast wave is activated, the cellular phone outputs audio at the stored television audio volume from a speaker. However, in a case where the timer activation of the terrestrial digital one-segment broadcast wave is carried out, if the television audio volume at the time of the view or recording performed immediately before is small, even when the timer activation is actually activated at the timer activation time, as the television audio volume output from the speaker along with the activation is small, such a case can also be considered that the user does not realize the timer activation. In such a case, if the user does not realize the timer activation during a period of the broadcast program at all, the user misses the entire broadcast program. Also, even when the user realizes the timer activation in the middle of the broadcast program, there is a problem that the user misses a program part which has been already broadcast.

SUMMARY OF THE INVENTION

Accordingly, the present invention has been made in view of the above-mentioned circumstances and it is an object of the invention to provide an information processing apparatus in which the user is made to realize the timer activation of viewing or recording the terrestrial digital broadcast wave, and also it is possible to prevent the missing view of the broadcast program based on the timer activation.

In order to solve the above-mentioned problem, according to an aspect of the present invention, there is provided an information processing apparatus, including: a reception unit configured to receive a broadcast wave transmitted from a broadcast station; a view processing unit configured to perform a view processing of the broadcast wave received by the reception unit; a generation unit configured to generate an activation request for activating the view processing unit at a previously set timer view time or timer recording time by using a timer; a timer view activation unit configured to activate the view processing unit on the basis of the activation request generated by the generation unit; and a storage unit configured to store a timer view purpose audio volume value used for a timer view processing performed by the view processing unit, in which in the case of an activation caused by the timer view activation unit, the view processing unit performs the view processing of the broadcast wave with use of the timer view purpose audio volume value stored in the storage unit.

In order to solve the above-mentioned problem, according to another aspect of the present invention, there is provided an information processing apparatus, including: a reception unit configured to receive a broadcast wave transmitted from a broadcast station; a display unit configured to display an image along with a view processing of the broadcast wave received by the reception unit; an output unit configured to output audio along with a view processing of the broadcast wave received by the reception unit; a generation unit configured to generate an activation request for activating the display unit and the output unit at a previously set timer view time or timer recording time by using a timer; a timer view activation unit configured to activate the display unit and the output unit on the basis of the activation request generated by the generation unit; and a storage unit configured to store a timer view purpose audio volume value used for a timer view processing, wherein in the case of an activation caused by the timer view activation unit, the output unit outputs audio along with a view processing of the broadcast wave with use of the timer view purpose audio volume value stored in the storage unit.

According to the aspect of the present invention, the user is made to realize the timer activation of viewing or recording the terrestrial digital broadcast wave, and also it is possible to prevent the missing view of the broadcast program based on the timer activation.

BRIEF DESCRIPTION OF THE DRAWINGS

FIG. 13 is an explanatory diagram for describing a gradual increase in a timer view recording purpose audio volume value at the time of the timer view recording processing;

DESCRIPTION OF THE PREFERRED EMBODIMENTS

Hereinafter, embodiments of the present invention will be described with reference to the drawings.

Figure 1A:
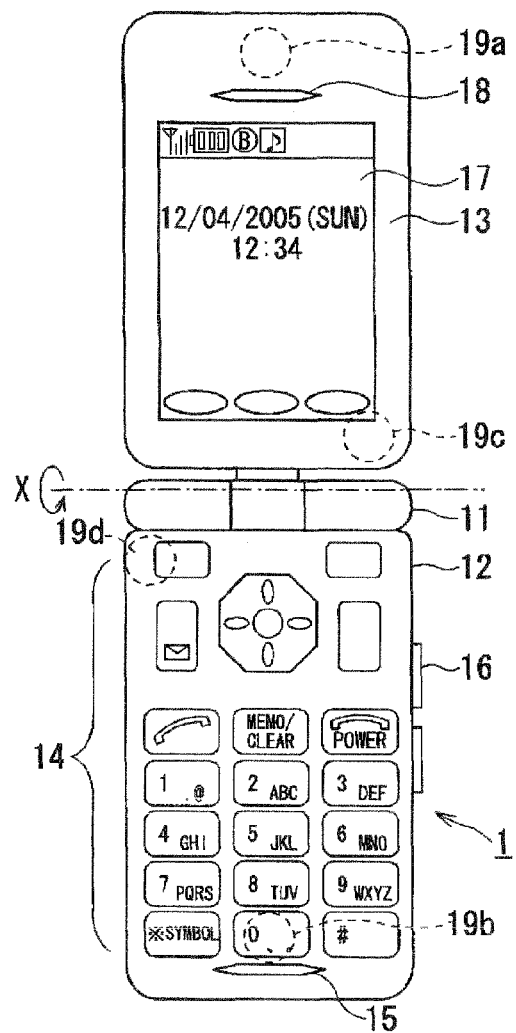
FIGS. 1A and 1B illustrate external appearance configurations of a cellular phone which can be applied to an information processing apparatus according to an embodiment of the present invention.
Figure 1B:
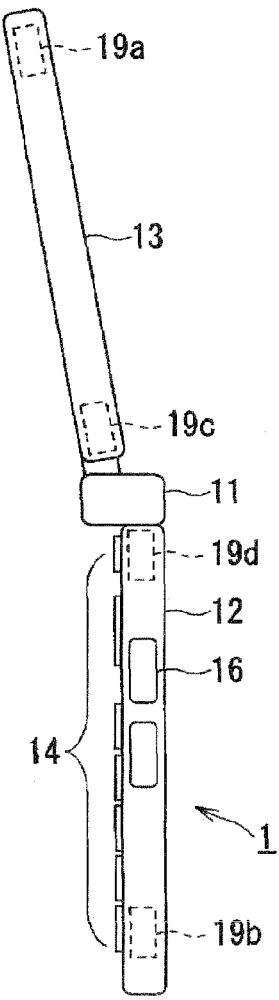

FIGS. 1A and 1B illustrate external appearance configurations of a cellular phone 1 which can be applied to an information processing apparatus according to an embodiment of the present invention. It should be noted that FIG. 1A illustrates an external appearance configuration of the cellular phone 1 opened at about 180 degrees viewed from the front, and FIG. 1B illustrates an external appearance configuration of the cellular phone 1 opened as viewed from the side.

As illustrated in FIGS. 1A and 1B, the cellular phone 1 includes a first casing 12 and a second casing 13 which are hinge-connected with a hinge part 11 at the center. And, the cellular phone is formed so as to be foldable in an arrow X direction via the hinge part 11. At a predetermined location inside the cellular phone 1, an antenna for transmission and reception (an antenna 31 in FIG. 3 which will be described later) is provided. The cellular phone 1 is adapted to transmit and receive a radio wave with a base station via the built-in antenna.

The first casing 12 is provided with operation keys 14 on its surface, such as alphanumeral keys from "0" to "9", an outgoing call key, a redial key, a power key, a clear key, and an electronic mail key. It is possible to input various instructions by using the operation keys 14.

The first casing 12 is provided with an arrow key and a confirmation key as the operation keys 14 in an upper part. As a user operates the arrow key in up, down, left, and right directions, an allocated cursor can be moved in the up, down, left, and right directions. To be more specific, various operations are executed such as a scroll operation of a telephone directory list and an electronic mail displayed on a main display 17 of the second casing 13, a page turning over operation of a simplified home page, and an image feed operation.

In addition, various functions can be confirmed by pressing the confirmation key. For example, in the first casing 12, in accordance with the operation of the arrow key by the user, a desired telephone number is selected from a plurality of telephone numbers in the telephone directory list displayed on the main display 17. When the confirmation key is pressed in an inside direction of the first casing 12, the selected telephone number is confirmed and an outgoing call processing is performed for the telephone number.

Furthermore, the first casing 12 is provided with the electronic key on the left of the arrow key and the confirmation key. When the electronic key is pressed in the inside direction of the first casing 12, it is possible to call mail transmission and reception functions. A browser key is provided on the right of the arrow key and the confirmation key. When the browser key is pressed in the inside direction of the first casing 12, it is possible to view data of a Web page.

In addition, the first casing 12 is provided with a microphone 15 at a lower part of the operation keys 14. With the microphone 15, voice of the user at the time of conversation is collected. Also, the first casing 12 is provided with a side key 16 with which operations of the cellular phone 1 are performed.

It should be noted that a battery pack is inserted to be attach on a back surface side of the first casing 12. When the power key is turned ON, electric power is supplied to the respective circuit units from the battery pack to activate the units in an operable state.

On the other hand, the second casing 13 is provided with the main display 17 on its front. In addition to the reception state of the radio wave, the battery remaining amount, other party names and telephone numbers registered as the telephone directory, the transmission history, the main display 17 can display the contents of the electronic mail, the simplified home page, an image picked up by a CCD (Charge Coupled Device) camera (a CCD camera 20 in FIGS. 2A and 2B which will be described later), a content received from an external content server, and a content stored in a memory card (a memory card 46 in FIG. 3 which will be described later). Also, a telephone receiver (earpiece) 18 is provided at a predetermined upper position of the main display 17. With this configuration, the user can perform the voice conversation. It should be noted that a speaker (a speaker 50 in FIG. 3) as an audio output unit other than a telephone receiver 18 is provided at a predetermined position of the cellular phone 1.

Also, magnetic sensors 19a, 19b, 19c, and 19d for detecting the state of the cellular phone 1 are provided at predetermined positions inside the first casing 12 and the second casing 13.

Figure 2A:
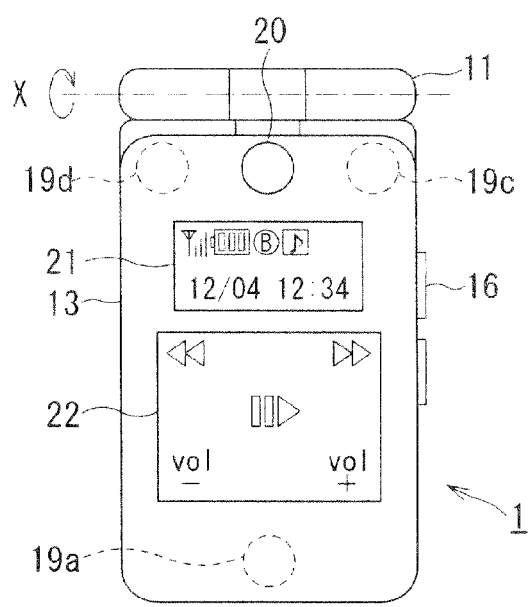
FIGS. 2A and 2B illustrate other external appearance configurations of the cellular phone which can be applied to the information processing apparatus according to the embodiment of the present invention.
Figure 2B:
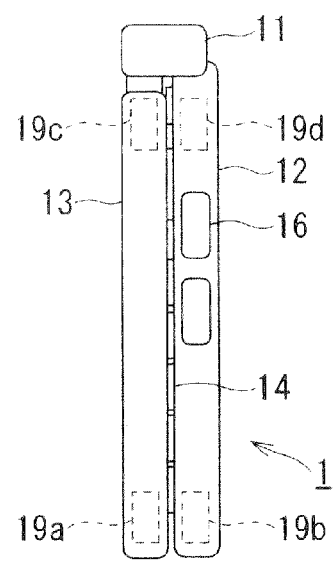

FIGS. 2A and 2B illustrate other external appearance configurations of the cellular phone 1 which can be applied to the information processing apparatus according to the embodiment of the present invention. A state of the cellular phone 1 in FIGS. 2A and 2B refers to a state in which the cellular phone 1 is turned from the state in FIGS. 1A and 1B in an arrow X direction. It should be noted that FIG. 2A illustrates an external appearance configuration of the cellular phone 1 closed as viewed from the front the cellular phone 1, and FIG. 2B illustrates an external appearance configuration of the cellular phone 1 closed as viewed from the side.

At an upper part of the second casing 13, the CCD camera 20 is provided. With this configuration, it is possible to pick up an image of a desired photography target. A sub display 21 is provided at a lower part of the CCD camera 20. An antenna pictogram indicating the current antenna sensitivity, a battery pictogram indicating the current battery remaining amount of the cellular phone 1, and the current time are displayed on the sub display 21.

Furthermore, an electrostatic touch pad 22 is provided at a lower part of the sub display 21. The electrostatic touch pad 22 is apparently composed of one sheet of touch pad, but sensors are provided at a plurality of positions. When the user touches a position in the vicinity of sensor, the sensor detects the touching. And, a rewinding function, a fast forward function, an audio volume down operation, an audio volume up operation, a reproduction operation, and a pause operation are executed in accordance with the detection by the sensor.

Figure 3:
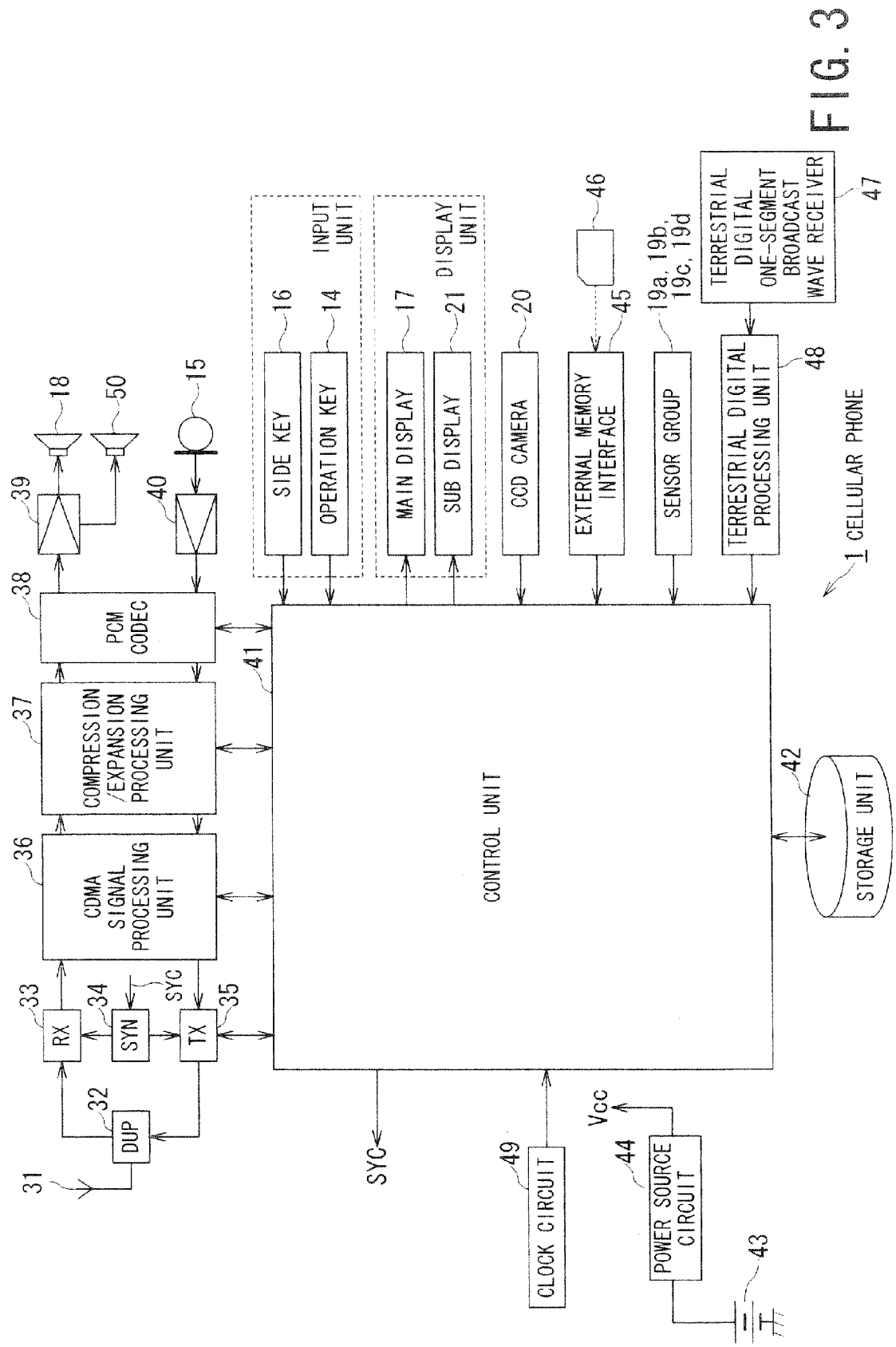
FIG. 3 is a block diagram of an internal configuration of the cellular phone which can be applied to the information processing apparatus according to the embodiment of the present invention.

FIG. 3 illustrates an inner configuration of the cellular phone 1 which can be applied to the information processing apparatus according to the embodiment of the present invention. A radio signal transmitted from the base station is received by the antenna 31, and thereafter input to a receiver (RX) 33 via an antenna duplexer (DUP) 32. The receiver 33 may perform mixing of the received radio signal with a local oscillator signal output from a frequency synthesizer (SYN) 34 to down-convert the received radio signal into an intermediate frequency signal. Then, the receiver 33 generates a reception baseband signal by performing a quadrature demodulation (quadrature detection) on the down-converted intermediate frequency signal. The receiver 33 outputs the generated baseband signal to a CDMA signal processing unit 36. It should be noted that the frequency of the local oscillator signal generated from the frequency synthesizer 34 is instructed on the basis of a control signal SYC output from a control unit 41.

The CDMA signal processing unit 36 is provided with a RAKE receiver. The RAKE receiver despreads a plurality of paths included in the reception baseband signal with the respective spread codes (that is, the same spread code as the spread code of the spread reception signal). Then, after the phase in the despread signals of the respective paths is adjusted, the despread signals of respective paths are coherently RAKE-combined by the RAKE receiver. The data series after the Rake combining is subjected to deinterleave and channel decoding (error correction decoding), and thereafter a binary data determination is carried out. With this configuration, it is possible to obtain reception packet data of a predetermined transmission format. The reception packet data is input to a compression/expansion processing unit 37.

The compression/expansion processing unit 37 is composed of a DSP (Digital Signal Processor). The compression/expansion processing unit 37 separates the reception packet data output from the CDMA signal processing unit 36 in a multiplexer/demultiplexer for each media, and perform a decoding processing on the separated data for each media. In the conversation mode, speech data corresponding to the conversation voice included in the reception packet data is decoded by way of speech codec. Also, like a television telephone mode, when motion image data is included in the reception packet data, the motion image data is decoded by way of video codec. Furthermore, when the reception packet data is a download content, after this download content is expanded, the expanded download content is output to the control unit 41.

The digital speech signal obtained through the decoding processing is supplied to a PCM codec 38. The PCM codec 38 may perform a PCM decoding on the digital speech signal output from the compression/expansion processing unit 37 and output the analog speech signal after the PCM decoding to a receiver amplifier 39. This analog speech signal is amplified by the call receiver amplifier 39 and thereafter output from the telephone receiver 18.

The digital motion image signal decoded by way of the video codec through the compression/expansion processing unit 37 is input to the control unit 41. The control unit 41 displays the motion image based on the digital motion image signal output from the compression/expansion processing unit 37 on the main display 17 via a video RAM such as a VRAM. It should be noted that the control unit 41 can display not only the received motion image data but also the motion image data picked up by the CCD camera 20 on the main display 17 via the video PAM.

In a case where the reception packet data is the electronic mail, the compression/expansion processing unit 37 supplies the electronic mail to the control unit 41. The control unit 41 instructs a storage unit 42 to store the electronic mail supplied from the compression/expansion processing unit 37. Then, in accordance with the operation by the user on the operation keys 14 functioning as the input unit, the control unit 41 reads out this electronic mail stored in the storage unit 42 and displays the read electronic mail on the main display 17.

On the other hand, in the conversation mode, the speech signal (analog speech signal) of the speaker (user) input to the microphone 15 is amplified to an appropriate level by a transmitter amplifier 40, and then subjected to a PCM encoding by the PCM codec 38. The digital speech signal after the PCM encoding is input to the compression/expansion processing unit 37. Also, the motion image signal output from the CCD camera 20 is digitalized by the control unit 41 to be input to the compression/expansion processing unit 37. Furthermore, the electronic mail as text data generated by the control unit 41 is also input to the compression/expansion processing unit 37.

The compression/expansion processing unit 37 may perform a compression encoding on the digital speech signal output from the PCM codec 38 in a format in accordance with a predetermined transmission data rate. With this configuration, the audio data is generated. Also, the compression/expansion processing unit 37 performs a compression encoding on the digital motion image signal output from the control unit 41 to generate the motion image data. Then, the compression/expansion processing unit 37 multiplexes the speech data and the motion image data in the multiplexer/demultiplexer in accordance with a predetermined transmission format. The compression/expansion processing unit 37 packetizes the data multiplexed in the multiplexer/demultiplexer. After that, the compression/expansion processing unit 37 outputs the transmission packet data after the packetization to the CDMA signal processing unit 36. In a case where the electronic mail is output from the control unit 41, the compression/expansion processing unit 37 multiplexes the electronic mail into the transmission packet data.

The CDMA signal processing unit 36 performs a spread spectrum processing on the transmission packet data output from the compression/expansion processing unit 37, with use of a spread code allocated to the transmission channel. Then, the CDMA signal processing unit 36 outputs the output signal after the spread spectrum processing to a transmission circuit (TX) 35. The transmission circuit 35 modulates the signal after the spread spectrum processing by using a digital modulation method such as a QPSK (Quadrature Phase Shift Keying) method. The transmission circuit 35 synthesizes the transmission signal after the digital modulation with the local oscillator signal generated from the frequency synthesizer 34 to up-convert the transmission signal into the radio signal. Then, the transmission circuit 35 performs a high frequency amplification on the radio signal generated through the up-conversion so as to obtain the transmission power level which is instructed by the control unit 41. The radio signal subjected to the high frequency amplification is supplied to the antenna 31 via the antenna duplexer 32 and transmitted from the antenna 31 to the base station.

In addition, the cellular phone 1 is provided with an external memory interface 45. The external memory interface 45 is provided with a slot to which the memory card 46 can be attached and detached. The memory card 46 is one type of flash memory cards represented by a NAND type flash memory card and a NOR type flash memory card. In the memory card 46, write and read of various data such as images, speech, and music can be performed via a ten-pin terminal. Furthermore, the cellular phone 1 is provided with a clock circuit (timer) 49 for measuring the current time.

Also, a terrestrial digital one-segment broadcast wave receiver 47 receives the terrestrial digital one-segment broadcast wave and the terrestrial digital radio broadcast wave from the broadcasting station. The terrestrial digital one-segment broadcast wave receiver 47 generates a TS (Transport Stream) signal based on the received terrestrial digital one-segment broadcast wave and the terrestrial digital radio broadcast wave to be supplied to a terrestrial digital processing unit 48. In a case where the terrestrial digital one-segment broadcast wave receiver 47 receives the terrestrial digital one-segment broadcast wave, the terrestrial digital processing unit 48 separates the TS signal based on the terrestrial digital one-segment broadcast wave from the terrestrial digital one-segment broadcast wave receiver 47 into an ES (Elementary Stream) related to the audio data and an ES related to video data. The terrestrial digital processing unit 48 decodes the separated audio data with an audio decoder (not shown) in the terrestrial digital processing unit 48 on the basis of a predetermined decoding method, and also decodes the separated video data with a video decoder (not shown) in the terrestrial digital processing unit 48 on the basis of a predetermined decoding method. Then, the terrestrial digital processing unit 48 supplies the control unit 41 with the audio signal after the decoding and the video signal after the decoding.

The control unit 41 is composed of a CPU (Central Processing unit), a ROM (Read Only Memory) and a RAM (Random Access Memory). The CPU executes various processings while following programs stored in the ROM or various application programs loaded from the storage unit 42 to the RAM, and also generates various control signals to be supplied to the respective units, thus controlling the cellular phone 1 in an overall manner. The RAM appropriately stores data necessary for the CPU to execute the various processings.

The storage unit 42 is composed, for example, of a flash memory which is a non-volatile memory in which electrical rewrite and deletion can be performed, an HDD (Hard Disc Drive), or the like. The storage unit 42 stores the various application programs to be executed by the CPU of the control unit 41 or various data groups.

A power source circuit 44 generates a predetermined operation power source voltage Vcc on the basis of the output of a battery 43 to be supplied to the respective circuit units.

First Embodiment

Figure 4:
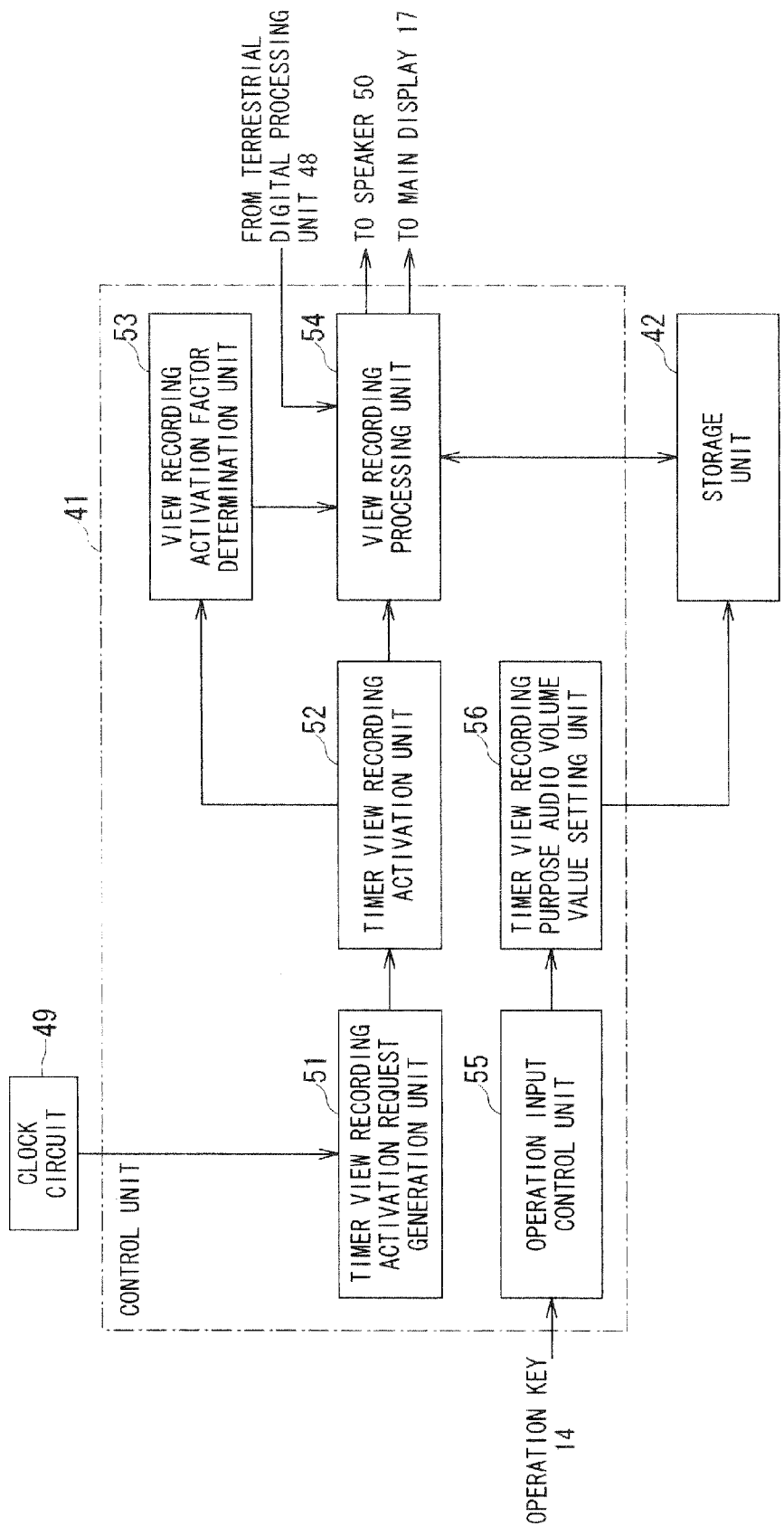
FIG. 4 is a block diagram of a functional configuration which can be executed by a control unit in FIG. 3 according to a first embodiment of the present invention.

FIG. 4 illustrates a functional configuration which can be executed by the control unit 41 in FIG. 3 according to the first embodiment of the present invention. It should be noted that components corresponding to the configuration in FIG. 3 are allocated with the same reference numeral, and a description thereof is omitted to avoid the repetition.

A timer view recording activation request generation unit 51 generates an activation request for activating a view recording processing unit 54 at a previously set timer view time or timer recording time as the user operates the operation keys 14 by using the clock circuit 49, and supplies the thus generated activation request to a timer view recording activation unit 52.

The timer view recording activation unit 52 generates an activation instruction signal for activating the view recording processing unit 54 at the previously set timer view time or timer recording time, on the basis of the activation request supplied from the timer view recording activation request generation unit 51 (the activation request for activating the view recording processing unit 54 at the previously set timer view time or timer recording time). The timer view recording activation unit 52 supplies the thus generated activation instruction signal to the view recording processing unit 54 to activate the view recording processing unit 54 at the previously set timer view time or timer recording time. Also, the timer view recording activation unit 52 supplies the thus generated activation instruction signal to a view recording activation factor determination unit 53.

The view recording activation factor determination unit 53 determines whether the activation factor of the view recording processing unit 54 is derived from the activation caused by the timer view recording activation unit 52, on the basis of the activation instruction signal supplied from the timer view recording activation unit 52. The view recording activation factor determination unit 53 supplies the determination result to the view recording processing unit 54.

The view recording processing unit 54 activates the view recording processing at the previously set timer view time or timer recording time, in response to the activation instruction signal supplied from the timer view recording activation unit 52. Also, while following the determination result from the view recording activation factor determination unit 53, in a case where it is determined that the activation factor of the view recording processing unit 54 is derived from the activation caused by the timer view recording activation unit 52, the view recording processing unit 54 performs the view recording processing of the broadcast wave received in the terrestrial digital one-segment broadcast wave receiver 47, by using a previously set timer view recording purpose audio volume value stored in the storage unit 42 or the ROM which is not shown of the control unit 41. On the other hand, in a case where it is determined that the activation factor of the view recording processing unit 54 is not derived from the activation caused by the timer view recording activation unit 52, the view recording processing unit 54 performs the view recording processing of the broadcast wave received in the terrestrial digital one-segment broadcast wave receiver 47, by using the audio volume value used in the view recording processing performed immediately before by the view recording processing unit 54 which is stored in the storage unit 42.

An operation input control unit 55 may accept various pieces of data and instruction inputs as the user operates the operation keys 14. On the basis of the setting instruction of the timer view recording purpose audio volume value whose input has been accepted by the operation input control unit 55, a timer view recording purpose audio volume value setting unit 56 sets a timer view recording purpose audio volume value used for the timer view recording processing, and supplies the set data related to the timer view recording purpose audio volume value to the storage unit 42.

Next, with reference to a flowchart of FIG. 5, the timer view recording processing in the cellular phone 1 in FIG. 4 will be described. It should be noted that this timer view recording processing is started at the previously set timer view time or timer recording time when the terrestrial digital one-segment broadcast wave receiver 47 is activated to carry out the timer view recording processing.

In step S1, the timer view recording activation request generation unit 51 generates an activation request for activating the view recording processing unit 54 at a timer view time or timer recording time (for example, at 19:00 on Dec. 15, 2007) which is previously set as the user operates the operation keys 14 by using the clock circuit 49. The timer view recording activation request generation unit 51 supplies the thus generated activation request to the timer view recording activation unit 52. It should be noted that depending on an implementation of the cellular phone 1, the view processing or recording may be started in a few minutes before the timer view time or timer recording time (for example, 1 or 2 minutes before). In such a case as well, the present invention can be applied. "The timer view time or timer recording time" is a concept which includes not only the precise time but also some time range with reference to the precise time.

In step S2, on the basis of the activation request supplied from the timer view recording activation request generation unit 51 (the activation request for activating the view recording processing unit 54 at the previously set timer view time or timer recording time), the timer view recording activation unit 52 generates an activation instruction signal for activating the view recording processing unit 54 at the previously set timer view time or timer recording time.

In step S3, the timer view recording activation unit 52 supplies the thus generated activation instruction signal to the view recording processing unit 54 to activate the view recording processing unit 54 at the previously set timer view time or timer recording time. That is, at this time, on the basis of the activation instruction signal from the timer view recording activation unit 52, the view recording processing unit 54 activates the view recording processing (the view processing or the recording processing) to activate the terrestrial digital one-segment broadcast wave receiver 47 and the terrestrial digital processing unit 48.

In addition, the timer view recording activation unit 52 supplies the thus generated activation instruction signal to the view recording activation factor determination unit 53.

In step S4, on the basis of the activation instruction signal supplied from the timer view recording activation unit 52, the view recording activation factor determination unit 53 determines whether the activation factor of the view recording processing unit 54 is derived from the activation caused by the timer view recording activation unit 52. That is, in a case where the user presses an activation button for activating the terrestrial digital one-segment broadcast wave receiver 47 among the operation keys 14 and the instruction of starting the reception of the terrestrial digital one-segment broadcast wave is issued, the activation instruction signal is not supplied from the timer view recording activation unit 52, and the view recording activation factor determination unit 53 thus determines that the activation factor of the view recording processing unit 54 is not derived from the activation caused by the timer view recording activation unit 52. On the other hand, the view recording activation factor determination unit 53 determines that the activation factor of the view recording processing unit 54 is derived from the activation caused by the timer view recording activation unit 52, on the basis of this activation instruction signal supplied from the timer view recording activation unit 52. Then, the view recording activation factor determination unit 53 supplies the determination result to the view recording processing unit 54.

It should be noted that according to the embodiments of the present invention, the processing in step S4 is performed after the start of the timer view recording processing but may be performed before the timer view recording processing.

In step S4, in a case where the view recording activation factor determination unit 53 determines that the activation factor of the view recording processing unit 54 is derived from the activation caused by the timer view recording activation unit 52, in step S5, in response to the activation instruction signal supplied from the timer view recording activation unit 52, the view recording processing unit 54 activates the view recording processing at the previously set timer view time or timer recording time. Also, in accordance with the determination result from the view recording activation factor determination unit 53, with use of the previously set timer view recording purpose audio volume value stored in the storage unit 42 or the ROM of the control unit 41, the view recording processing unit 54 performs the view recording processing of the broadcast wave received in the terrestrial digital one-segment broadcast wave receiver 47 via the main display 17 and the speaker 50.

For example, when the timer view recording purpose audio volume value of the speaker 50 used at the time of the timer view recording processing can be set in 21 stages, the timer view recording purpose audio volume value is set in advance to an audio volume value in the 15th stage as a default value. Of course, this timer view recording purpose audio volume value (for example, an audio volume value in the 12th stage among 21 stages) may be changed in accordance with a preference of the user. With this configuration, upon the timer view recording processing (the timer view processing time and the timer recording processing time), the view recording processing unit 54 activates the view recording processing (the view processing and the recording processing) at the previously set timer view time or timer recording time. Also, by using the previously set timer view recording purpose audio volume value (for example, the audio volume value in the 15th stage out of the 21 stages), the view recording processing unit 54 performs the view recording processing (the view processing and the recording processing) of the broadcast wave received in the terrestrial digital one-segment broadcast wave receiver 47 via the main display 17 and the speaker 50. Then, the audio based on the audio signal is output at the previously set timer view recording purpose audio volume value (audio output) from the speaker 50. It should be noted that in the case of the timer recording processing, the recording processing of the broadcast wave received in the terrestrial digital one-segment broadcast wave receiver 47 is performed via the main display 17 and the speaker 50, but at this time, the received broadcast wave is simultaneously stored in the storage unit 42.

On the other hand, in step S4, in a case where the view recording activation factor determination unit 53 determines that the activation factor of the view recording processing unit 54 is not derived from the activation caused by the timer view recording activation unit 52 (that is, in a case where the view recording activation factor determination unit 53 determines that this is not the activation of the timer view recording), in step S6, the view recording processing unit 54 reads out from the storage unit 42 the audio volume value used for the view recording processing immediately performed by the view recording processing unit 54 which is stored in the storage unit 42. By using the read audio volume value used for the view recording processing immediately performed by the view recording processing unit 54, the view recording processing unit 54 performs the view recording processing of the broadcast wave received in the terrestrial digital one-segment broadcast wave receiver 47 via the main display 17 and the speaker 50.

For example, in a case where in the view recording processing immediately performed by the view recording processing unit 54, for example, an audio volume value in the 4th stage among the 21 stages is used, the view recording processing unit 54 uses the audio volume value used for the view recording processing (the view processing and the recording processing) immediately performed by the view recording processing unit 54 (for example, the audio volume value in the 4th stage among the 21 stages) to perform the view recording processing (the view processing and the recording processing) of the broadcast wave received in the terrestrial digital one-segment broadcast wave receiver 47, and outputs (sounds) the audio based on the audio signal at the audio volume value used in the immediately performed view recording processing from the speaker 50.

According to the embodiments of the present invention, the terrestrial digital one-segment broadcast wave transmitted from the broadcasting station is received. The view recording processing of the received terrestrial digital one-segment broadcast wave is performed. By using the time (the clock circuit 49), the activation request for activating the view recording processing unit 54 at the previously set timer view time or timer recording time is generated. On the basis of the thus generated activation request, the view recording processing unit 54 is subjected to the activation of the timer view recording at the previously set timer view time or timer recording time. It is determined whether the activation factor of the view recording processing unit 54 is derived from the activation caused by the timer view recording activation unit 52, and in a case where it is determined that the activation factor of the view recording processing unit 54 is derived from the activation caused by the timer view recording activation unit 52, the view recording processing unit 54 can perform the view recording processing of the terrestrial digital one-segment broadcast wave by using the previously set timer view recording purpose audio volume value.

On the other hand, in a case where it is determined that the activation factor of the view recording processing unit 54 is not derived from the activation caused by the timer view recording activation unit 52, the view recording processing unit 54 can perform the view recording processing of the terrestrial digital one-segment broadcast wave by using the audio volume value stored in the storage unit 42.

With this configuration, in a case where the timer activation of the terrestrial digital one-segment broadcast wave is to be carried out, it is possible to perform the view recording processing of the terrestrial digital one-segment broadcast wave by using the previously set timer view recording purpose audio volume value, and it is possible to avoid such a situation that since the television audio volume at the time of the view or recording performed immediately before is small, even when the timer activation is performed at the timer activation time, the television audio volume output from the speaker 50 along with the activation is so small that the user does not realize the timer activation. Therefore, the cellular phone can prevent the user from missing the entire or a part of the broadcast program, the user realizes the timer activation of viewing or recording the terrestrial digital broadcast wave, and also it is possible to prevent the missing view of the broadcast program based on the timer activation. As a result, it is possible to improve the usability in the case of utilizing the terrestrial digital one-segment broadcast wave or the like.

It should be noted that according to the embodiments of the present invention, the timer view processing and the timer recording processing are separately described, but "timer view" used in claims includes a meaning of the timer recording as well. Therefore, "the timer view processing" also includes such a case that the terrestrial digital one-segment broadcast wave receiver 47 is automatically activated at the timer recording start time on the basis of the timer recording and the display is performed on the main display 17 together with the recording.

Figure 5:
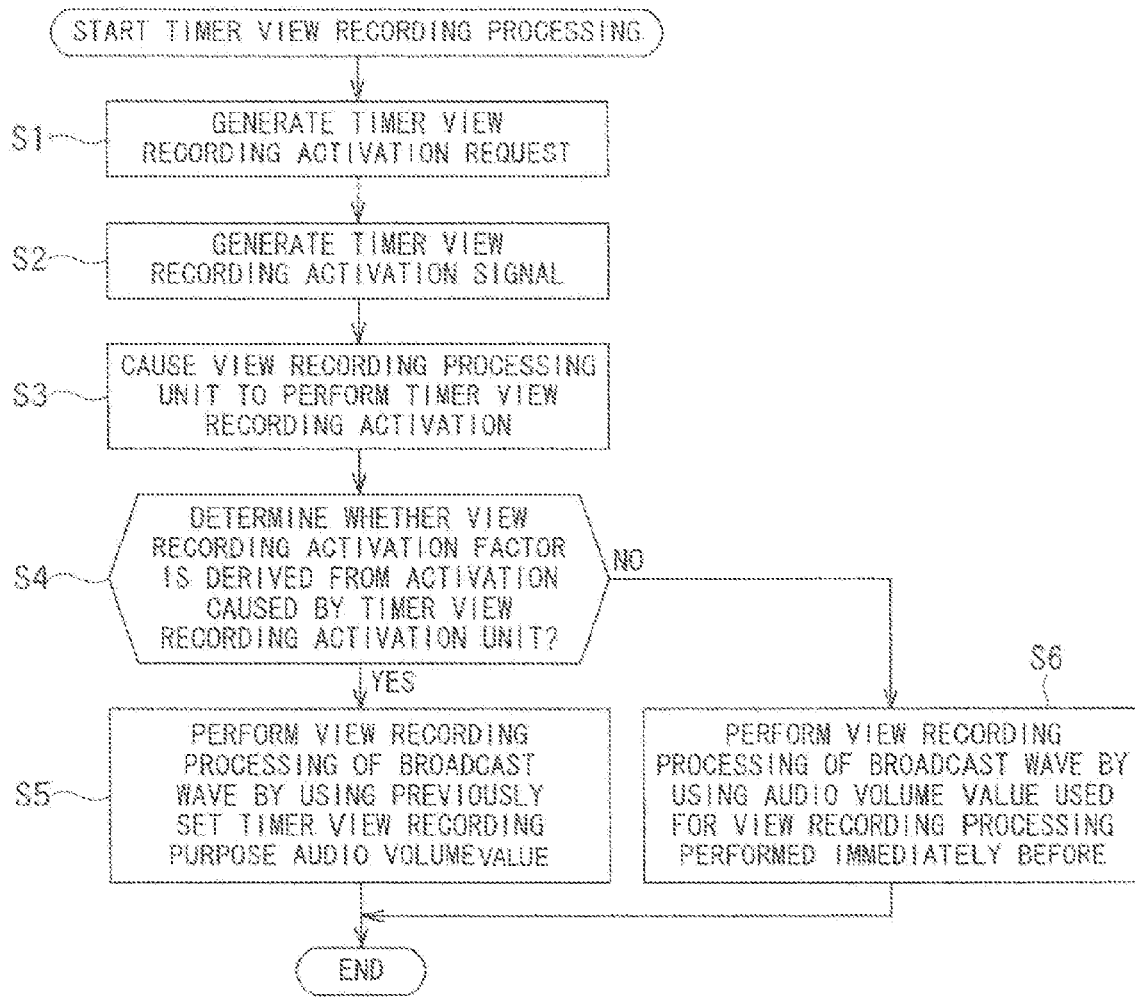
FIG. 5 is a flowchart for describing a timer view recording processing in the cellular phone in FIG. 4.

It should be noted that in the timer view recording processing described with use of the flowchart of FIG. 5, in a case where the view recording activation factor determination unit 53 determines that the activation factor of the view recording processing unit 54 is derived from the activation caused by the timer view recording activation unit 52, irrespective of the timer view or the timer recording, by using the previously set timer view recording purpose audio volume value, the view recording processing of the broadcast wave received in the terrestrial digital one-segment broadcast wave receiver 47 is performed via the main display 17 and the speaker 50. In the case of the timer recording, since the received broadcast wave is stored in the storage unit 42, there are no problems even when the user does not particularly pay attention to the start of the broadcast program in many cases. In view of the above, in the case of the timer view, by using the previously set timer view purpose audio volume value, the view processing of the broadcast wave received in the terrestrial digital one-segment broadcast wave receiver 47 is performed via the main display 17 and the speaker 50. On the other hand, in the case of the timer recording, by using a timer recording purpose audio volume value which is different from the previously set timer view purpose audio volume value (an audio volume value lower than the timer view purpose audio volume value), the view processing of the broadcast wave received in the terrestrial digital one-segment broadcast wave receiver 47 may be performed via the main display 17 and the speaker 50. Also, the view processing of the broadcast wave may be performed while the audio is muted. The timer view recording processing using this method is illustrated in a flowchart of FIG. 6. It should be noted that the processing in steps S11 to S14 and S18 in FIG. 6 are similar to the processing in steps S1 to S4 and S6 in FIG. 5, and a description thereof will be omitted to avoid the repetition.

Figure 6:
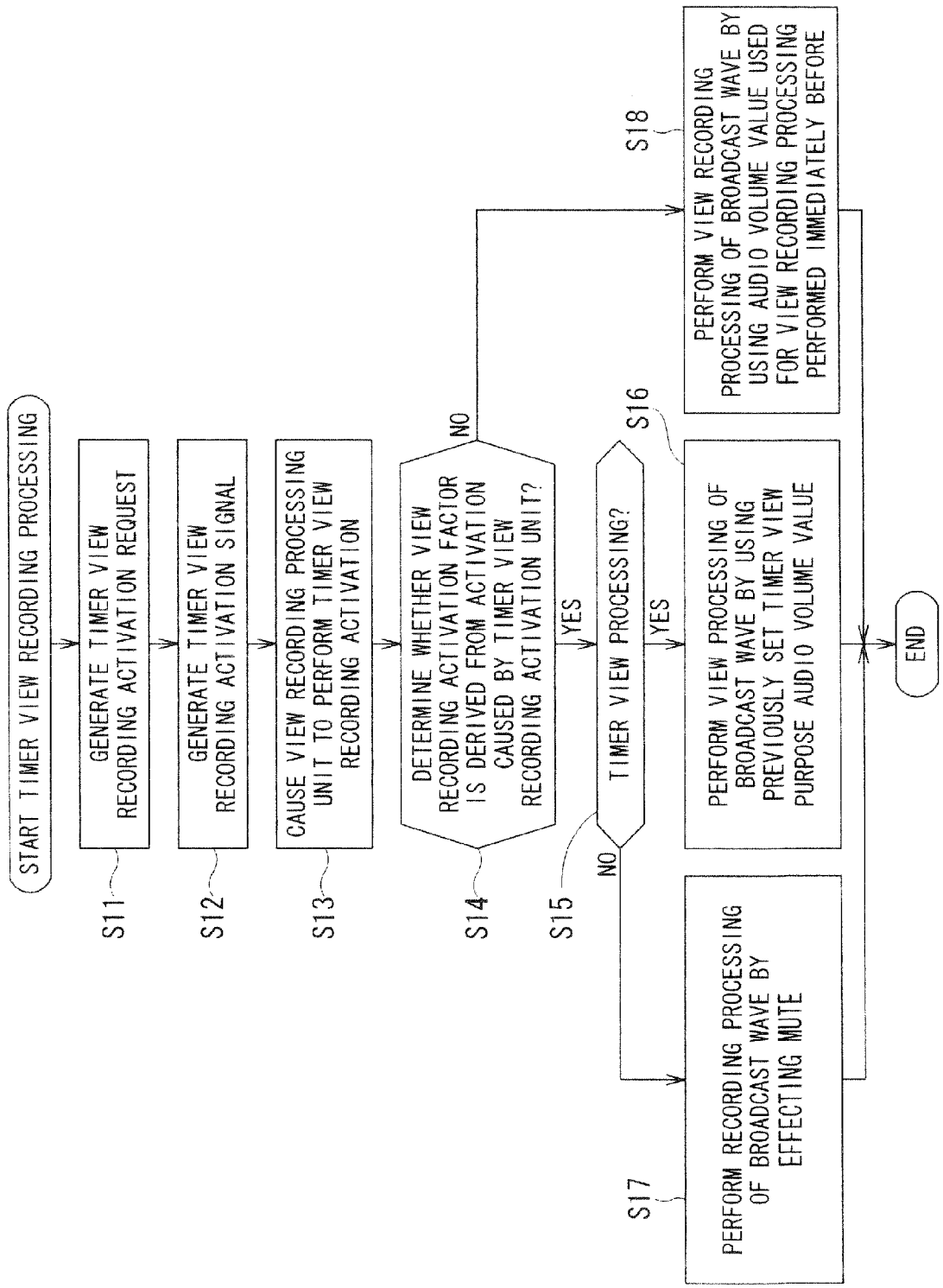
FIG. 6 is a flowchart for describing another timer view recording processing in the cellular phone in FIG. 4.

As illustrated in the flowchart of FIG. 6, in Step S14, in a case where the view recording activation factor determination unit 53 determines that the activation factor of the view recording processing unit 54 is derived from the activation caused by the timer view recording activation unit 52, the view recording processing unit 54 determines in step S15 whether the view recording processing is the timer view processing or the timer recording processing on the basis of the activation instruction signal from the timer view recording activation unit 52. In step S15, when the view recording processing unit 54 determines that the view recording processing is the timer recording processing, in step S16, by using the previously set timer view purpose audio volume value (for example, the audio volume value in the 15th stage among the 21 stages), the view recording processing unit 54 performs the view processing of the broadcast wave received in the terrestrial digital one-segment broadcast wave receiver 47 via the main display 17 and the speaker 50.

On the other hand, in step S15, in a case where the view recording processing unit 54 determines that the view recording processing is the timer recording processing, in step S17, the view recording processing unit 54 mutes audio to perform the recording processing of the broadcast wave received in the terrestrial digital one-segment broadcast wave receiver 47 via the main display 17 and the speaker 50. It should be noted that instead of muting the audio, by using the timer recording purpose audio volume value which is different from the previously set timer view purpose audio volume value (an audio volume value lower than the timer view purpose audio volume value), the recording processing of the broadcast wave may be performed via the main display 17 and the speaker 50.

With this configuration, the cellular phone can prevent the user from missing the entire or a part of the broadcast program. In particular, at the time of the timer view, the user realizes the timer activation of viewing or recording the terrestrial digital broadcast wave, and the cellular phone can also prevent the user from missing view of the broadcast program based on the timer activation. On the other hand, at the time of the timer recording, as a result, it is possible to further improve the usability in the case of utilizing the terrestrial digital one-segment broadcast wave or the like.

Figure 7:
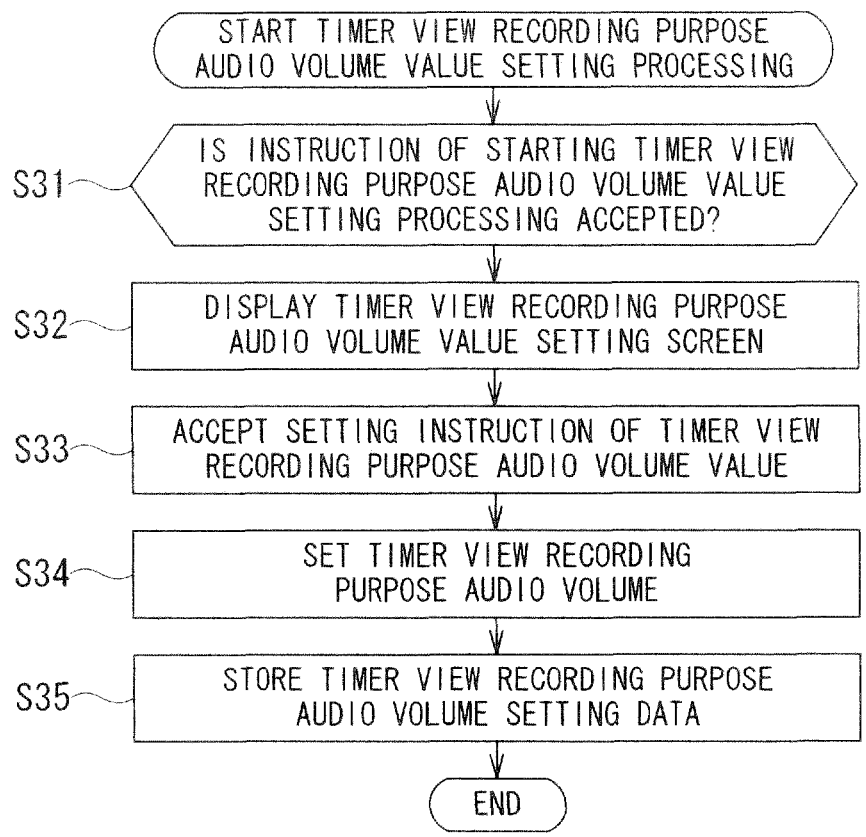
FIG. 7 is a flowchart for describing a timer view recording purpose audio volume value setting processing in the cellular phone in FIG. 4.

It should be noted that in accordance with a preference of the user, the timer view recording purpose audio volume value may be appropriately set. As illustrated in a flowchart of FIG. 7, in step S31, the operation input control unit 55 of the control unit 41 determines whether an instruction of starting a timer view recording purpose audio volume value setting processing is accepted as the user operates the operation keys 14, and stands by until it is determined that the instruction of starting the timer view recording purpose audio volume value setting processing is accepted. In step S31, in a case where the operation input control unit 55 determines that the instruction of starting the timer view recording purpose audio volume value setting processing is accepted, in step S32, the control unit 41 controls the main display 17 to display a timer view recording purpose audio volume value setting screen for setting the timer view recording purpose audio volume value on the main display 17.

In step S33, the operation input control unit 55 accepts a setting instruction of the timer view recording purpose audio volume value on the timer view recording purpose audio volume value setting screen displayed on the main display 17 as the user operates the operation keys 14. For example, by using a status bar of the audio volume value displayed on the timer view recording purpose audio volume value setting screen, the setting instruction indicating that the 15th stage among the 21 stages is set is accepted. In step S34, on the basis of the setting instruction of the timer view recording purpose audio volume value whose input has been accepted by the operation input control unit 55, the timer view recording purpose audio volume value setting unit 56 sets the timer view recording purpose audio volume value used for the timer view recording processing, and supplies the set data related to the timer view recording purpose audio volume value to the storage unit 42. In step S35, the control unit 41 stores the set data related to the timer view recording purpose audio volume value in the storage unit 42. With this configuration, in accordance with a preference of the user, the timer view recording purpose audio volume value is set. Of course, the timer view recording purpose audio volume value may be appropriately changed.

It should be noted that according to the first embodiment of the present invention, at the time of the timer view recording processing, the view recording processing of the broadcast wave is executed by using the previously set timer view recording purpose audio volume value. However, in accordance with a noise or an environment around the cellular phone 1, the timer view recording purpose audio volume value is decided, and the decided timer view recording purpose audio volume value may be used. Hereinafter, a description will be given of a second embodiment of the present invention.

Second Embodiment

Figure 8:
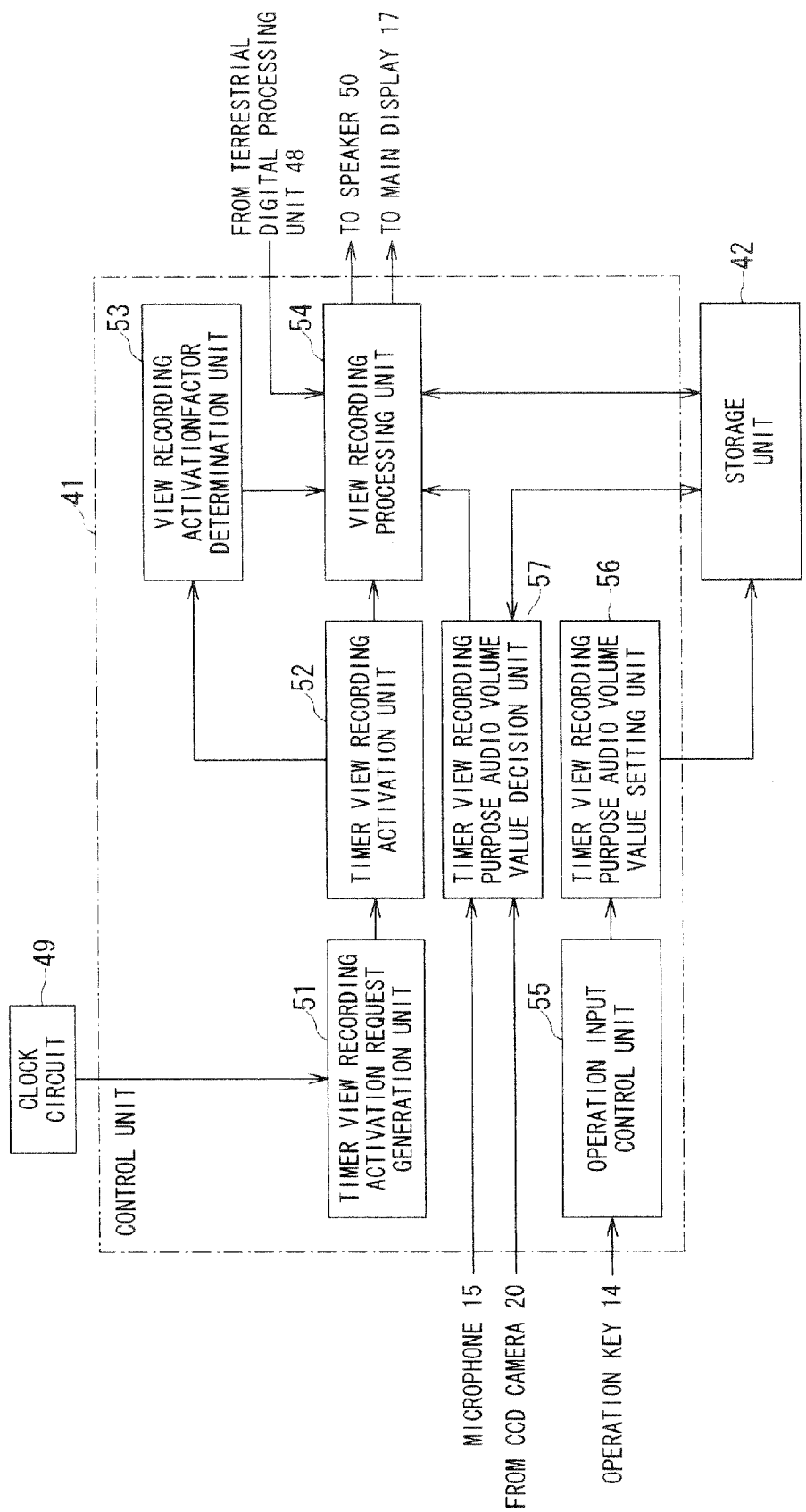
FIG. 8 is a block diagram of a functional configuration which can be executed by the control unit in FIG. 3 according to a second embodiment of the present invention.

FIG. 8 illustrates a functional configuration which can be executed by the control unit 41 in FIG. 3 according to the second embodiment of the present invention. It should be noted that components corresponding to the configuration in FIG. 4 are reference numeral, and a description thereof is omitted to avoid the repetition.

A timer view recording purpose audio volume value decision unit 57 reads out a timer view recording purpose audio volume value decision table stored in the storage unit 42 from the storage unit 42, and refers to the read timer view recording purpose audio volume value decision table to decide the timer view recording purpose audio volume value used at the time of the timer view recording processing on the basis of the noise level around the cellular phone 1 which is collected by the microphone 15 or the light amount level around the cellular phone 1 which is obtained by the CCD camera 20. The timer view recording purpose audio volume value decision unit 57 supplies the decision data related to the decided timer view recording purpose audio volume value to the view recording processing unit 54.

Figure 9:
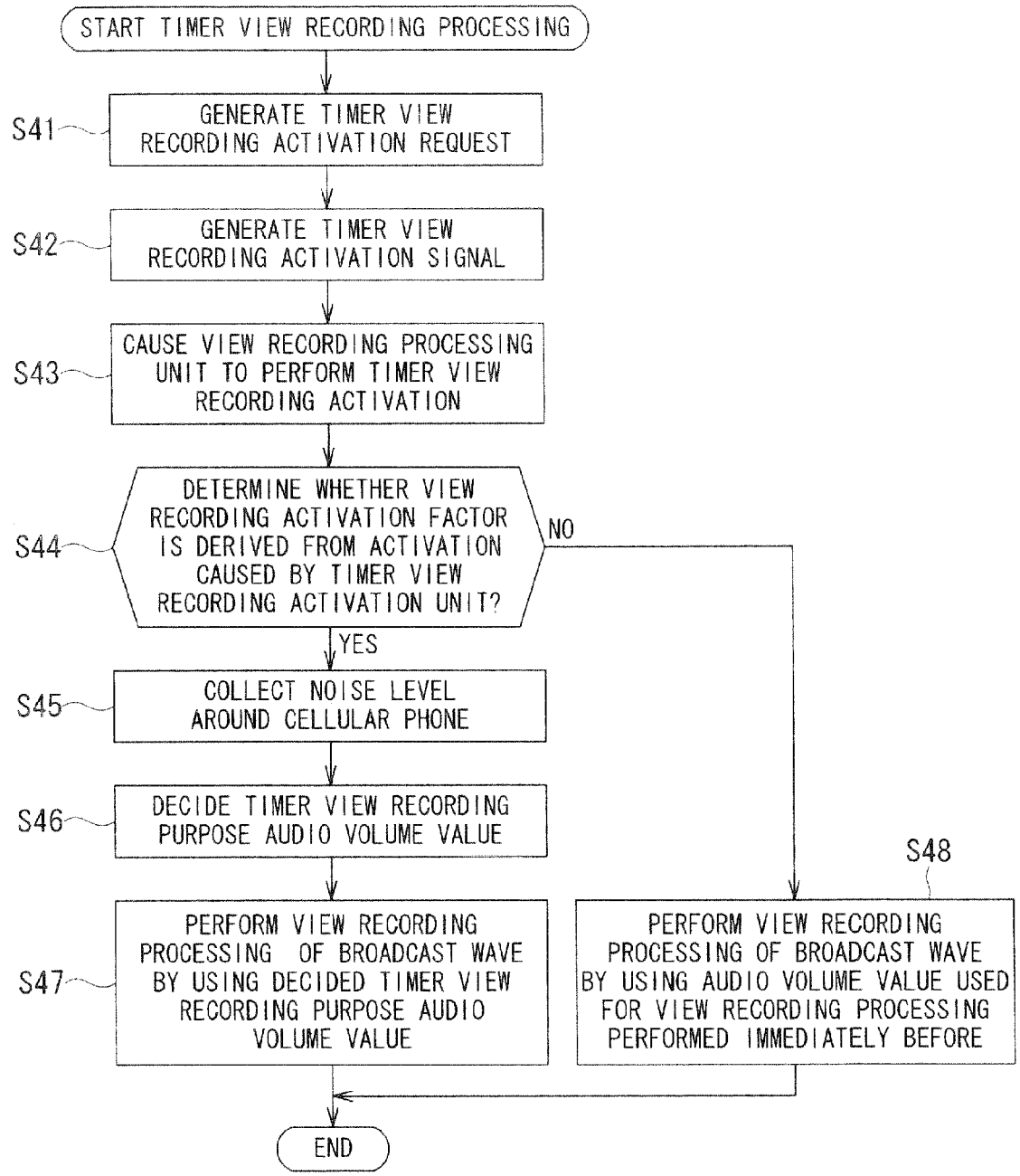
FIG. 9 is a flowchart for describing a timer view recording processing in a cellular phone in FIG. 8.

Next, with reference to a flowchart of FIG. 9, the timer view recording processing in the cellular phone 1 in FIG. 8 will be described. It should be noted that the processing in steps S41 to S44 and S48 in FIG. 9 is similar to the processing in steps S1 to S4 and S6 in FIG. 5, and a description thereof will be omitted to avoid the repetition.

In step S44, in a case where the view recording activation factor determination unit 53 determines that the activation factor of the view recording processing unit 54 is derived from the activation caused by the timer view recording activation unit 52, in step S45, the microphone 15 collects the noise level around the cellular phone 1 while following the control of the control unit 41 and the microphone 15 supplies an audio signal corresponding to the collected noise level to the timer view recording purpose audio volume value decision unit 57 of the control unit 41 via the PCM codec 38.

In step S46, when the timer view recording purpose audio volume value decision unit 57 obtains the audio signal (the audio signal corresponding to the noise level) supplied from the microphone 15, the timer view recording purpose audio volume value decision table previously stored in the storage unit 42 is read out.

Figure 10:
FIG. 10 illustrates a configuration example of a timer view recording purpose audio volume value decision table stored in a storage unit in FIG. 8.

FIG. 10 illustrates a configuration example of the timer view recording purpose audio volume value decision table stored in the storage unit 42. As illustrated in FIG. 10, in accordance with the magnitude of the noise level around the cellular phone 1 (levels 1 to 4), audio volume values in the timer view recording purpose audio volume value in 10th, 14th, 16th, and 18th stages out of the 21 stages are previously associated and registered. It should be noted that as the noise level around the cellular phone 1 is larger, a higher timer view recording purpose audio volume value is registered.

Figure 11:
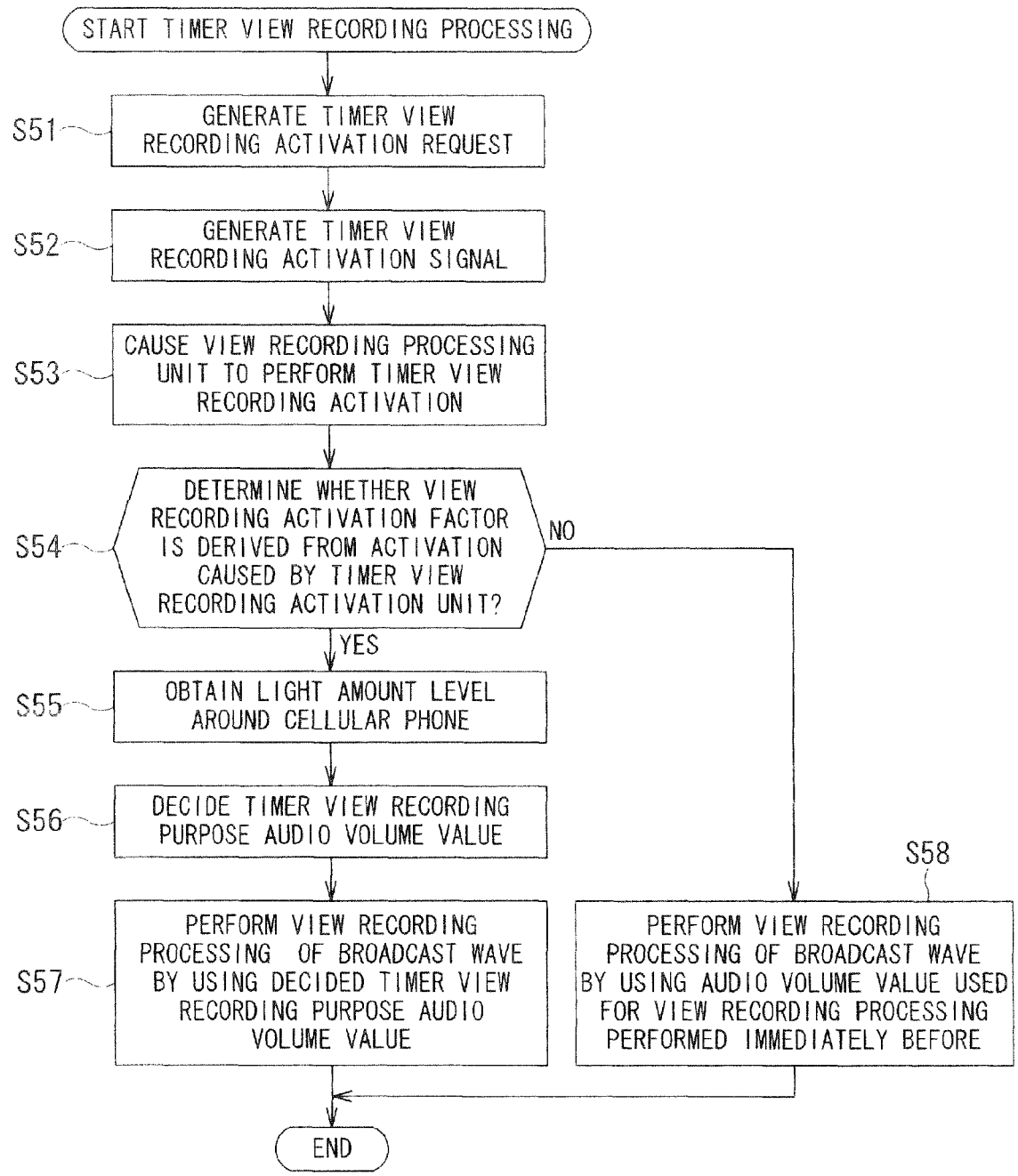
FIG. 11 is a flowchart for describing another timer view recording processing in the cellular phone in FIG. 8.

The timer view recording purpose audio volume value decision unit 57 decides the timer view recording purpose audio volume value used at the time of the timer view recording processing on the basis of the noise level around the cellular phone 1 which is collected by the microphone 15, with reference to the read timer view recording purpose audio volume value decision table. In the case of FIG. 11, when the noise level around the cellular phone 1 which is collected by the microphone 15 is at level 3, as the timer view recording purpose audio volume value used at the time of the timer view recording processing "the audio volume value in the 16th stage among the 21 stages" is decided by the timer view recording purpose audio volume value decision unit 57. The timer view recording purpose audio volume value decision unit 57 supplies the decision data related to the decided timer view recording purpose audio volume value to the view recording processing unit 54.

In step S47, the view recording processing unit 54 activates the view recording processing at the previously set timer view time or timer recording time, in response to the activation instruction signal supplied from the timer view recording activation unit 52. Also, while following the determination result from the view recording activation factor determination unit 53, by using the timer view recording purpose audio volume value (for example, the audio volume value in the 16th stage out of the 21 stages) decided by the timer view recording purpose audio volume value decision unit 57, the view recording processing unit 54 performs the view recording processing of the broadcast wave received in the terrestrial digital one-segment broadcast wave receiver 47 via the main display 17 and the speaker 50.

With this configuration, in a case where the timer activation of the terrestrial digital one-segment broadcast wave is to be carried out, it is possible to perform the view recording processing of the terrestrial digital one-segment broadcast wave with use of the timer view recording purpose audio volume value which is decided while using the microphone 15 by the timer view recording purpose audio volume value decision unit 57. While the audio is output from the speaker 50 at an appropriate audio volume value in accordance with the noise situation around the cellular phone 1, it is possible to avoid such a situation that as the television audio volume at the time of the view or recording performed immediately before is small, even when the timer activation is performed at the timer activation time, the television audio volume output from the speaker 50 along with the activation is so small that the user does not realize the timer activation. Therefore, it is possible to further improve the usability in the case of utilizing the terrestrial digital one-segment broadcast wave or the like.

As shown in FIG. 9, the timer view recording purpose audio volume value used for the timer view recording processing may be decided with use of the noise level around the cellular phone 1 which is collected by the microphone 15. In addition, since there is a correlation between the noise level around the cellular phone 1 and the light amount level around the cellular phone 1, the timer view recording purpose audio volume value used at the time of the timer view recording processing may also be decided on the basis of the light amount level around the cellular phone 1 which is obtained by the CCD camera 20. The timer view recording processing using this method is illustrated in a flowchart of FIG. 11. At this time, in the case of the CCD camera 20 as well, the timer view recording purpose audio volume value decision table illustrated in FIG. 10 is similarly used.

In step S54, in a case where the view recording activation factor determination unit 53 determines that the activation factor of the view recording processing unit 54 is derived from the activation caused by the timer view recording activation unit 52, in step S55, in accordance with the control of the control unit 41, the CCD camera 20 obtains the light amount level around the cellular phone 1 and supplies an image signal (electrical signal) corresponding to the thus obtained light amount level to the timer view recording purpose audio volume value decision unit 57 of the control unit 41. In step S56, when the timer view recording purpose audio volume value decision unit 57 obtains the image signal (electrical signal) corresponding to the light amount level supplied from the CCD camera 20, the timer view recording purpose audio volume value decision unit 57 reads out a timer view recording purpose audio volume value decision table previously stored in the storage unit 42. The timer view recording purpose audio volume value decision unit 57 decides the timer view recording purpose audio volume value used at the time of the timer view recording processing on the basis of the image signal (electrical signal) corresponding to the light amount level supplied from the CCD camera 20, with reference to the read timer view recording purpose audio volume value decision table.

With this configuration, similarly to the case of using the microphone 15, in a case where the timer activation of the terrestrial digital one-segment broadcast wave is to be carried out, with use of the timer view recording purpose audio volume value decided while using the microphone 15 by the timer view recording purpose audio volume value decision unit 57, it is possible to perform the view recording processing of the terrestrial digital one-segment broadcast wave. While the audio is output from the speaker 50 at an appropriate audio volume value in accordance with the noise situation around the cellular phone 1, it is possible to avoid such a situation that as the television audio volume at the time of the view or recording performed immediately before is small, even when the timer activation is performed at the timer activation time, the television audio volume output from the speaker 50 along with the activation is so small that the user does not realize the timer activation.

It should be noted that in combination with the collection of the noise level by the microphone 15 with the obtaining of the light amount level by the CCD camera 20, the timer view recording purpose audio volume value used at the time of the timer view recording processing may also be decided. Of course, the light amount level around the cellular phone 1 may also be obtained by using an optical sensor other than the CCD camera 20.

Figure 12:
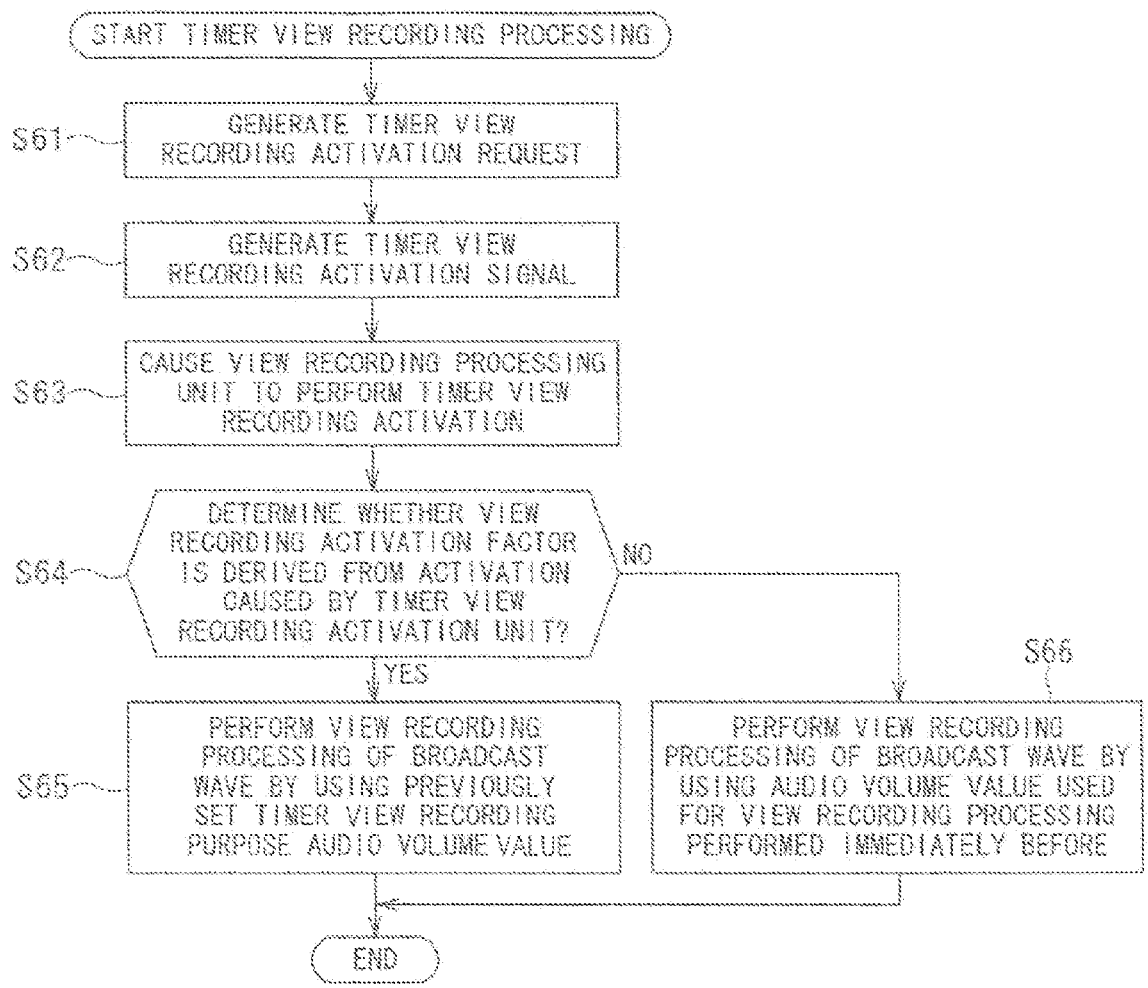
FIG. 12 is a flowchart for describing another timer view recording processing in the cellular phone in FIG. 4.

Incidentally, in step S5 of FIG. 5 and step S16 of FIG. 6 the view recording processing unit 54 activates the view recording processing at the previously set timer view time or timer recording time in response to the activation instruction signal supplied from the timer view recording activation unit 52. Also, while following the determination result from the view recording activation factor determination unit 53, with use of one of the previously set timer view recording purpose audio volume values stored in the storage unit 42 or the ROM of the control unit 41, the view recording processing of the broadcast wave received in the terrestrial digital one-segment broadcast wave receiver 47 is performed via the main display 17 and the speaker 50. However, the present invention is not limited to the above-mentioned configuration. For example, the timer view recording purpose audio volume value used at the time of the timer view recording processing may be increased stepwise for every certain period of time (for example, 2 or 3 seconds). As illustrated in step S65 of FIG. 12, while following the activation instruction signal supplied from the timer view recording activation unit 52, the view recording processing unit 54 activates the view recording processing at the previously set timer view time or timer recording time. Also, while following the determination result from the view recording activation factor determination unit 53, with use of one of the previously set timer view recording purpose audio volume values stored in the storage unit 42 or the ROM of the control unit 41, as illustrated in a table of FIG. 13, the audio volume value is increased stepwise for every certain period of time (for example, 2 or 3 seconds) from the start of the timer activation, and the view recording processing of the broadcast wave received in the terrestrial digital one-segment broadcast wave receiver 47 is performed via the main display 17 and the speaker 50. In the case of the table of FIG. 13, between steps 1 to 6, the timer view recording purpose audio volume value is sequentially increased from the audio volume value in the 11th stage out of the 21 stages to the audio volume value in the 21st stage. Of course, when the timer view recording purpose audio volume value is increased stepwise, instead of increasing the timer view recording purpose audio volume value to the maximum value of the 21st stage among the 21 stages, the increase may be stopped in the 15th stage or the like in the middle.

With this configuration, while the audio is subsequently output from the speaker 50 at an appropriate audio volume value in accordance with the noise situation around the cellular phone 1 without a support of particular hardware, it is possible to avoid such a situation that as the television audio volume at the time of the view or recording performed immediately before is small, even when the timer activation is performed at the timer activation time, the television audio volume output from the speaker 50 along with the activation is so small that the user does not realize the timer activation. As a result, while giving consideration to the environment around the cellular phone 1, it is possible to further improve the usability in the case of utilizing the terrestrial digital one-segment broadcast wave or the like.

Figure 14A:
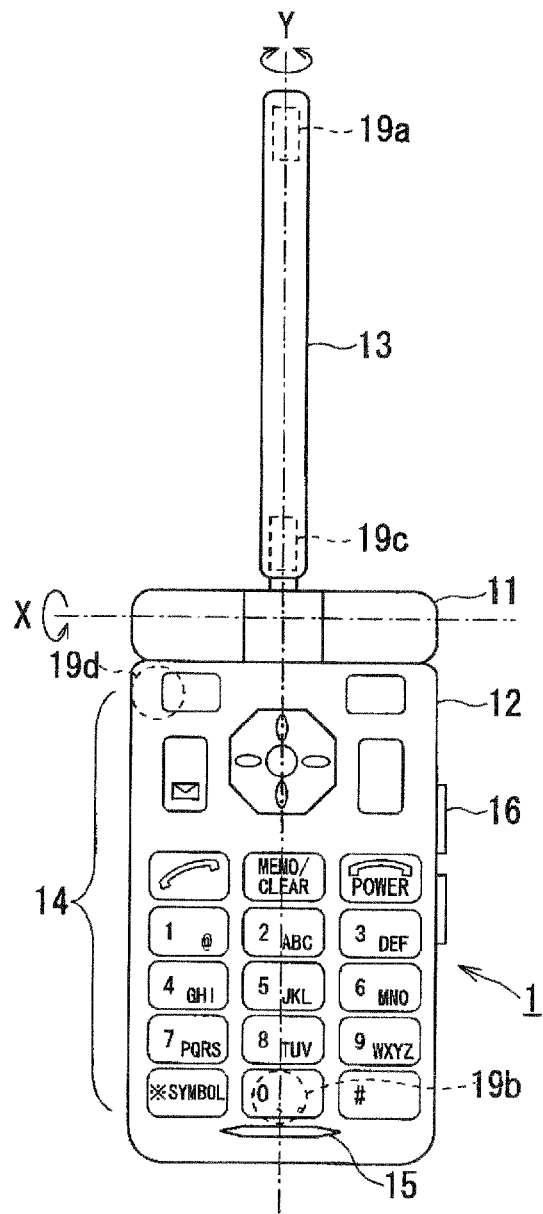
FIGS. 14A and 14B illustrate other external appearance configurations of the cellular phone which can be applied to the information processing apparatus according to the embodiment of the present invention.
Figure 14B:
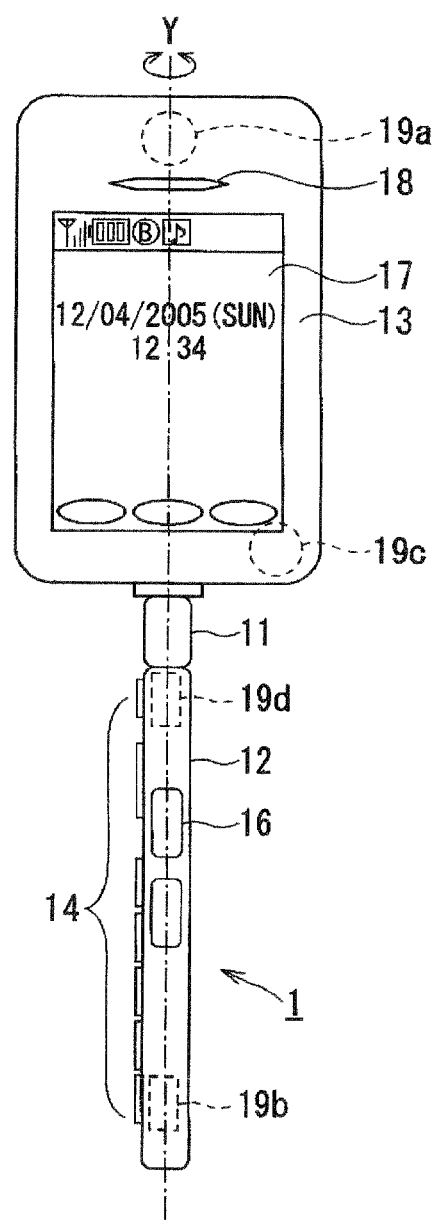

Incidentally, at the time of the timer view recording processing, depending on the state of the casing of the cellular phone 1, the timer view recording purpose audio volume value used at the time of the timer view recording processing may be set as different values. That is, the cellular phone 1 illustrated in FIGS. 1A, 1B, 2A, and 2B is a biaxial pivotal style cellular phone, and as illustrated in FIGS. 14A and 14B, it is possible to perform 90-degree panning motion from the state of the cellular phone 1 in FIGS. 1A and 1B in an arrow Y direction. It should be noted that FIG. 14A illustrates an external appearance configuration of the cellular phone 1 after the 90-degree panning motion in the arrow Y direction as viewed from the front, and FIG. 14B illustrates an external appearance configuration of the cellular phone 1 after the 90-degree panning motion in the arrow Y direction as viewed from the side.

Figure 15A:
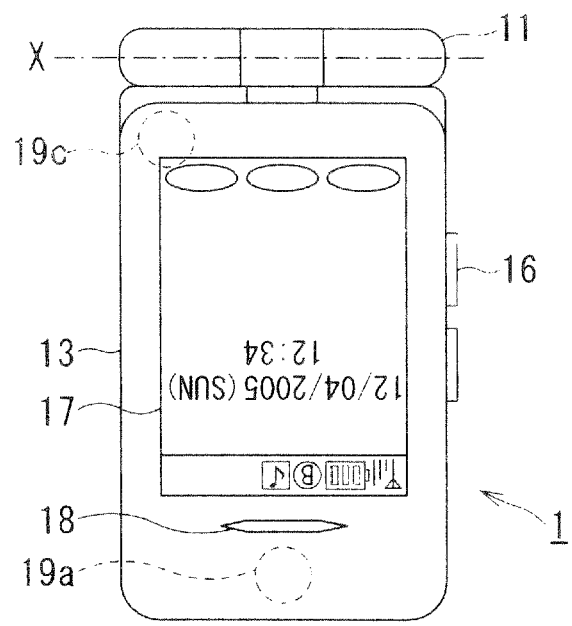
FIGS. 15A and 15B illustrate other external appearance configurations of the cellular phone which can be applied to the information processing apparatus according to the embodiment of the present invention.
Figure 15B:
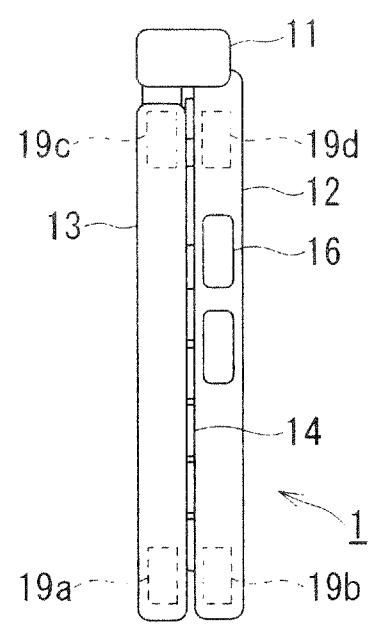

In addition, as illustrated in FIGS. 15A and 15B, after about 180-degree panning motion in the arrow Y direction from the state of the cellular phone 1 in FIGS. 14A and 14B, the cellular phone 1 is turned in the arrow X direction, so that the first casing 12 and the second casing 13 can be overlapped one another in a state where the main display 17 faces outward. The state of the cellular phone 1 illustrated in FIGS. 15A and 15B is so-called turnover style. It should be noted that FIG. 15A illustrates an external appearance configuration of the cellular phone 1 in the turnover style as viewed from the front, and FIG. 15B illustrates an external appearance configuration of the cellular phone 1 in the turnover style as viewed from the side. Then, in the state of FIGS. 1A, 1B, 2A and 2B, the main display 17 is hidden inside. On the other hand, in the state of the turnover style in FIGS. 15A and 15B, the main display 17 is exposed to the outside. In a case where the main display 17 is exposed to the outside at the time of the timer view recording processing, the user realizes that the timer view recording is to be started, and it is possible to estimate that the user desires to view the broadcast wave. In view of the above, regarding the state of the casing of the cellular phone 1, in a case where the main display 17 is exposed to the outside, the timer view recording purpose audio volume value used at the time of the timer view recording processing is larger as compared with a case where the main display 17 is hidden inside, and by using this audio volume value, the audio may be output from the speaker 50. Hereinafter, a description will be given of a third embodiment of the present invention.

Third Embodiment

Figure 16:
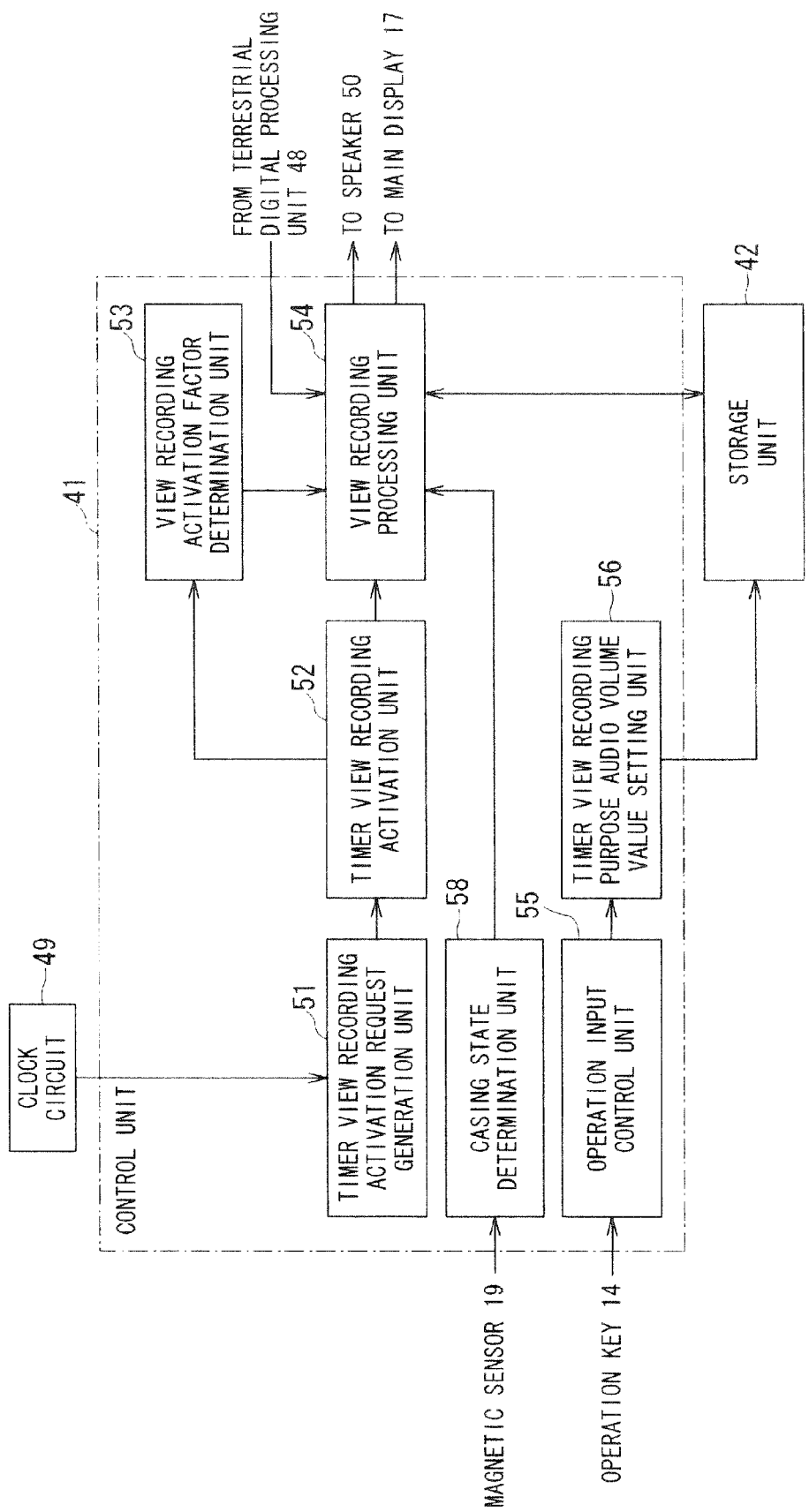
FIG. 16 is a block diagram of a functional configuration which can be executed by the control unit in FIG. 3 according to a third embodiment of the present invention.

FIG. 16 illustrates a functional configuration which can be executed by the control unit 41 in FIG. 3 according to the third embodiment of the present invention. It should be noted that components corresponding to the configuration in FIG. 4 are allocated with the same reference numeral, and a description thereof is omitted to avoid the repetition.

A casing state determination unit 58 determines about the state of the cellular phone 1 whether the main display 17 is exposed to the outside or the main display 17 is hidden inside by using the magnetic sensors 19a to 19d and supplies the determination result to the view recording processing unit 54.

Figure 17:
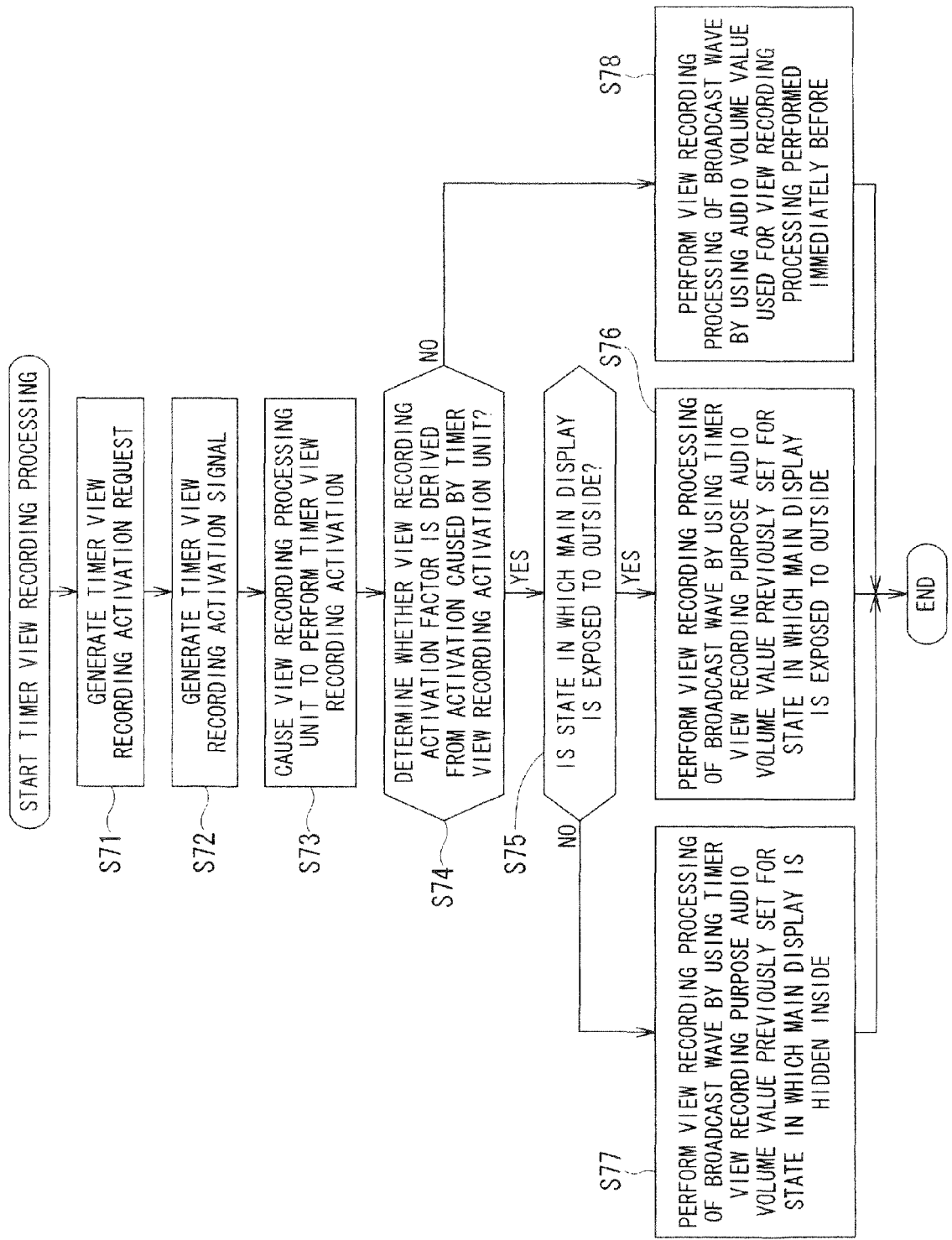
FIG. 17 is a flowchart for describing a timer view recording processing in the cellular phone of FIG. 16.

Next, with reference to a flowchart of FIG. 17, the timer view recording processing in the cellular phone 1 of FIG. 16 will be described. It should be noted that the processing in steps S71 to S74 and S78 of FIG. 17 is basically similar to the processing in step S1 to S4 and S6 of FIG. 5, and a description thereof is omitted to avoid the repetition.

In step S74, in a case where the view recording activation factor determination unit 53 determines that the activation factor of the view recording processing unit 54 is derived from the activation caused by the timer view recording activation unit 52, the casing state determination unit 58 of the control unit 41 determines in step S75 whether the main display 17 is exposed to the outside or the main display 17 is hidden inside and supplies the determination result to the view recording processing unit 54.

In step S75, in a case where the casing state determination unit 58 determines that the main display 17 is exposed to the outside, in step S76, in response to the activation instruction signal supplied from the timer view recording activation unit 52, the view recording processing unit 54 activates the view recording processing at the previously set timer view time or timer recording time. Also, while following the determination result from the view recording activation factor determination unit 53, the view recording processing unit 54 performs the view recording processing of the broadcast wave received in the terrestrial digital one-segment broadcast wave receiver 47 via the main display 17 and the speaker 50, with use of the previously set timer view recording purpose audio volume value stored in the storage unit 42 or the ROM of the control unit 41. At this time, as the main display 17 is exposed to the outside, the user realizes that the timer view recording is to be started, and it is possible to estimate that the user desires to view the broadcast wave. The view recording processing unit 54 uses a timer view recording purpose audio volume value used set for the state in which the main display 17 is exposed to the outside (for example, an audio volume value in the 20th stage or the like out of the 21 stages) among the previously set timer view recording purpose audio volume values to perform the view recording processing of the broadcast wave received in the terrestrial digital one-segment broadcast wave receiver 47 via the main display 17 and the speaker 50.

On the other hand, in step S75, in a case where the casing state determination unit 58 determines that the main display 17 is not exposed to the outside (that is, in a case where the casing state determination unit 58 determines that the main display 17 is hidden inside), in step S77, in response to the activation instruction signal supplied from the timer view recording activation unit 52, the view recording processing unit 54 activates the view recording processing at the previously set timer view time or timer recording time. Also, while following the determination result from the view recording activation factor determination unit 53, the view recording processing unit 54 performs the view recording processing of the broadcast wave received in the terrestrial digital one-segment broadcast wave receiver 47 via the main display 17 and the speaker 50, with use of the previously set timer view recording purpose audio volume value stored in the storage unit 42 or the ROM which is not shown of the control unit 41. At this time, since the main display 17 is hidden inside, it is estimated that the user does not realize that the timer view recording is to be started. The view recording processing unit 54 uses a timer view recording purpose audio volume value used set for the state in which the main display 17 is hidden inside (for example, an audio volume value in the 15th stage among the 21 stages) among the previously set timer view recording purpose audio volume values to perform the view recording processing of the broadcast wave received in the terrestrial digital one-segment broadcast wave receiver 47 via the main display 17 and the speaker 50.

With this configuration, the cellular phone can prevent the user from missing the entire or a part of the broadcast program while the user realizes the timer activation of viewing or recording the terrestrial digital broadcast wave. In addition, not only missing view of the broadcast program based on the timer activation can be prevented, but also while it is estimated whether the user desires to view a program at this moment, the audio can be output from the speaker 50 at an appropriate audio volume value in accordance with each state of the cellular phone 1. As a result, it is possible to further improve the usability in the case of utilizing the terrestrial digital one-segment broadcast wave or the like.

Figure 18:
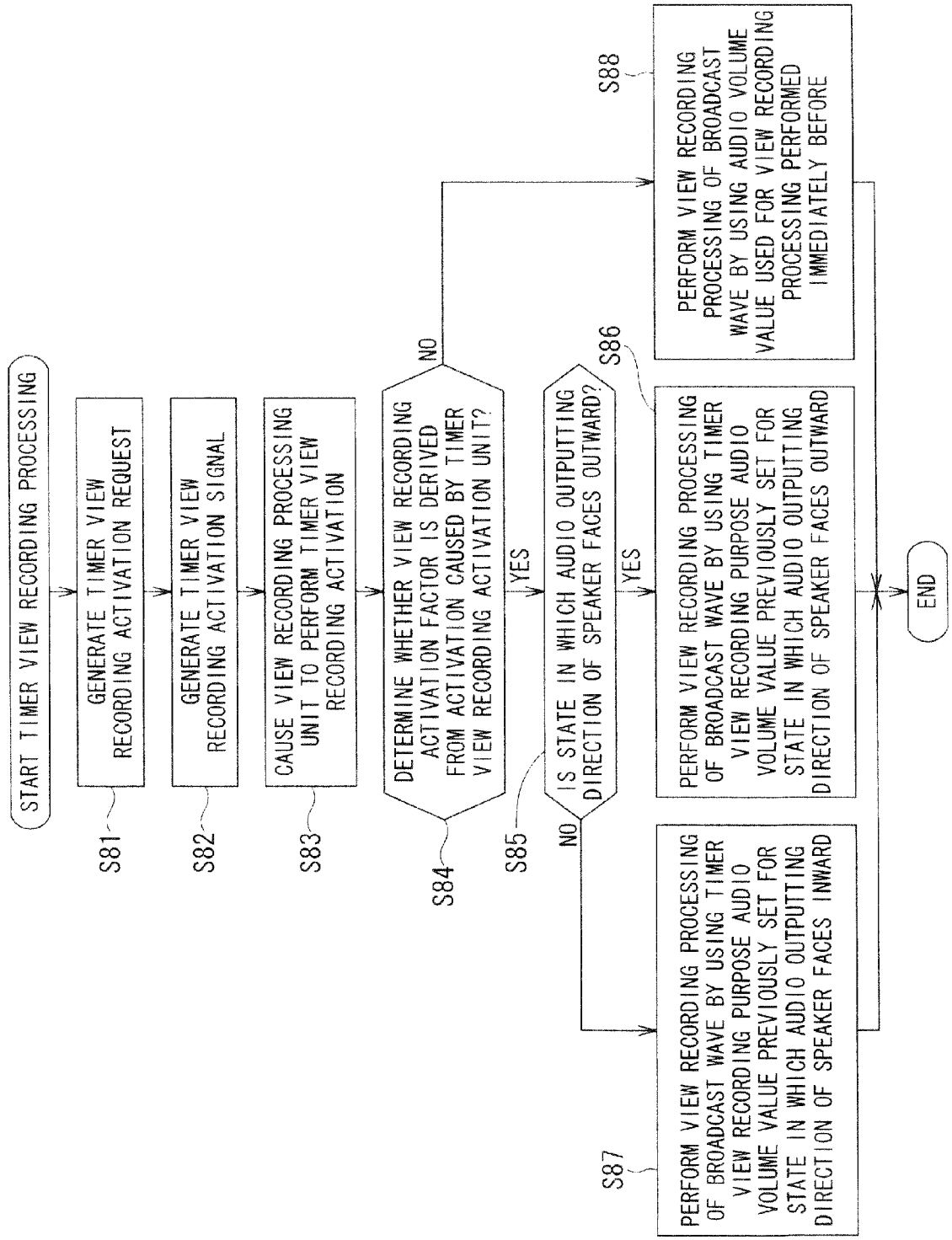
FIG. 18 is a flowchart for describing another timer view recording processing in the cellular phone of FIG. 16.

It should be noted that as illustrated in the flowchart of FIG. 18, in step S85, in a case where the casing state determination unit 58 determines that the audio outputting direction of the speaker 50 provided to the cellular phone 1 faces outward, in step S86, as the audio outputting direction of the speaker 50 faces outward, while the user can realize that the timer view recording is to be realized even with a small audio volume, the view recording processing unit 54 uses the timer view recording purpose audio volume value set for the state in which the audio outputting direction of the speaker 50 faces outward (for example, the audio volume value in the 13th stage among the 21 stages) among the previously set timer view recording purpose audio volume values to perform the view recording processing of the broadcast wave received in the terrestrial digital one-segment broadcast wave receiver 47 via the main display 17 and the speaker 50.

On the other hand, in step S85, in a case where the casing state determination unit 58 determines that the audio outputting direction of the speaker 50 provided to the cellular phone 1 does not face outward (that is, in a case where the casing state determination unit 58 determines that the audio outputting direction of the speaker 50 provided to the cellular phone 1 faces inward), in step S87, as the audio outputting direction of the speaker 50 faces inward, while it is difficult for the user to realize that the timer view recording is to be started with the small audio volume, the view recording processing unit 54 uses the timer view recording purpose audio volume value set for the state in which the audio outputting direction of the speaker 50 faces inward (for example, the audio volume value in the 19th stage or the like out of the 21 stages) among the previously set timer view recording purpose audio volume value to perform the view recording processing of the broadcast wave received in the terrestrial digital one-segment broadcast wave receiver 47 via the main display 17 and the speaker 50.

With this configuration, irrespective of the audio outputting direction of the speaker 50, the cellular phone can prevent the user from missing the entire or a part of the broadcast program, and while the user realizes the timer activation of viewing or recording the terrestrial digital broadcast wave, it is possible to prevent missing view of the broadcast program based on the timer activation.

It should be noted that when the timer view recording processing is performed in the cellular phone 1, in a case where the user has already sets a manner mode (a silent mode, an alarm mode or a driving mode), it is estimated that the user intentionally has set the silent mode with consideration of the surrounding environment, and a manner mode temporal cancellation confirmation screen is not displayed on the main display 17 along with the timer view recording processing. Instead, the user realizes the start of the timer view recording processing, and only an image may be displayed on the main display 17 after the audio volume value from the speaker 50 is set as 0. At this time, in a case where the start of the reception of the terrestrial digital one-segment broadcast wave is instructed as the user presses an activation button for activating the terrestrial digital one-segment broadcast wave receiver 47 among the operation keys 14, even in the case of the manner mode, it is possible to estimate that the user realizes that the timer view recording is to be started but desires to view the broadcast wave. Thus, after the manner mode temporal cancellation confirmation screen is displayed on the main display 17, the image is displayed on the main display 17, and also the audio is output from the speaker 50. Hereinafter, a description will be given of the timer view recording processing using this method. It should be noted that the timer view recording processing using this method can be realized by using the cellular phone 1 in FIG. 4 according to the first embodiment of the present invention.

Figure 19:
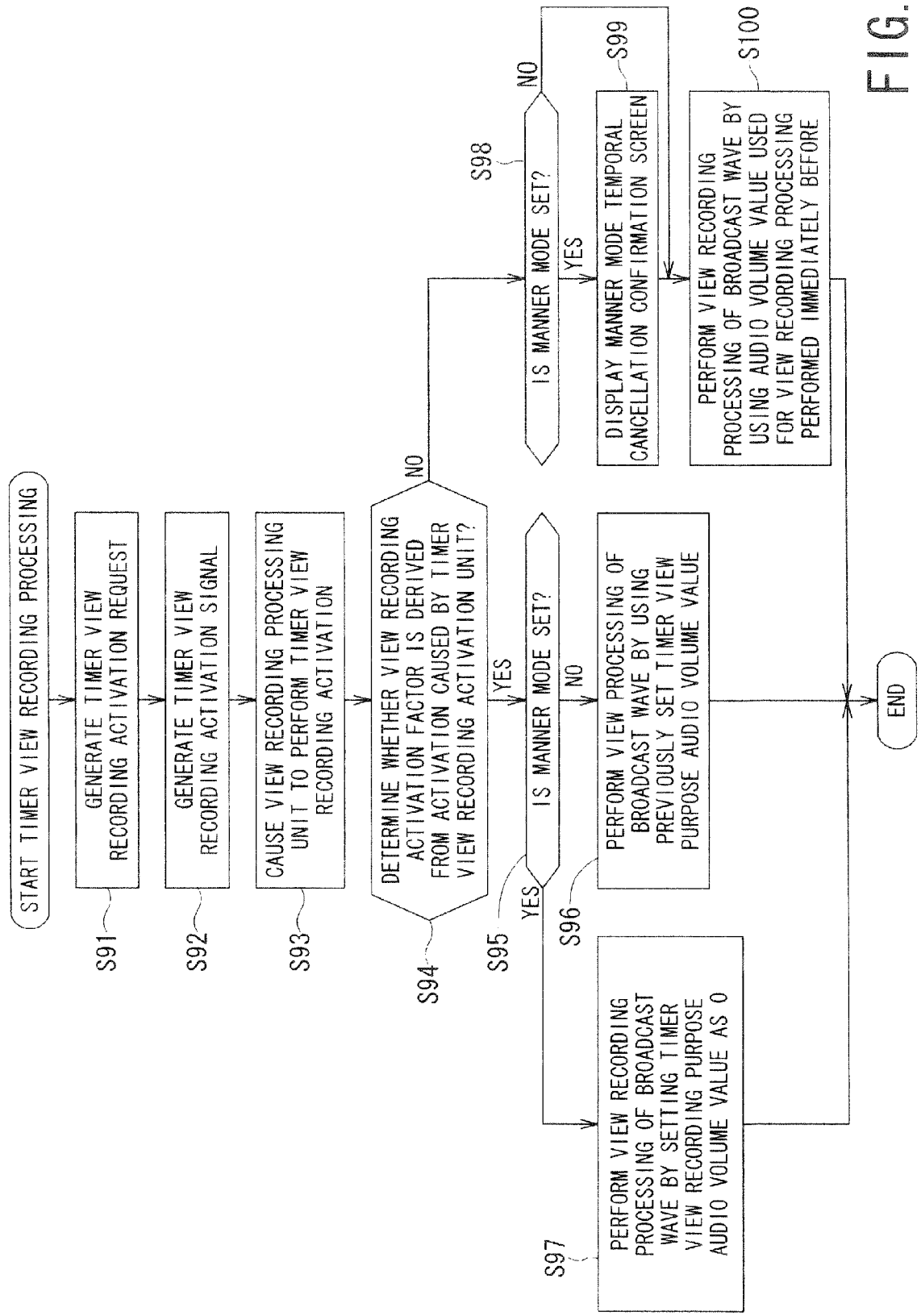
FIG. 19 is a flowchart for describing another timer view recording processing in the cellular phone in FIG. 4.

As illustrated in a flowchart of FIG. 19, in step S94, in a case where the view recording activation factor determination unit 53 determines that the activation factor of the view recording processing unit 54 is derived from the activation caused by the timer view recording activation unit 52, in step S95, the view recording processing unit 54 reads the set data stored in the storage unit 42 and determines on the basis of the read set data whether the manner mode is set in the cellular phone 1. In step S95, in a case where the view recording processing unit 54 determines that the manner mode is not set in the cellular phone 1, the processing is advanced to step S96. On the other hand, in step S95, in a case where the view recording processing unit 54 determines that the manner mode is set in the cellular phone 1, step S97, it is estimated that the user intentionally set the silent mode in consideration with the surrounding environment, and also the view recording processing unit 54 sets the timer view recording purpose audio volume value as 0 so that the user can realize that the timer view recording processing is to be started, and the view recording processing unit 54 performs the view recording processing of the broadcast wave received in the terrestrial digital one-segment broadcast wave receiver 47 via the main display 17 and the speaker 50.

On the other hand, in step S94, in a case where the view recording activation factor determination unit 53 determines that the activation factor of the view recording processing unit 54 is not derived from the activation caused by the timer view recording activation unit 52, in step S98, the view recording processing unit 54 determines on the basis of the set data which is read from the storage unit 42 whether the manner mode is set in the cellular phone 1. In step S98, in a case where the view recording processing unit 54 determines that the manner mode is not set in the cellular phone 1, the processing is advanced to step S100. On the other hand, in step S98, in a case where the view recording processing unit 54 determines that the manner mode is set in the cellular phone 1, in step S99, even in the case of the manner mode, as it is possible to estimate that the user realizes that the timer view recording is to be started but desires to view the broadcast wave, the view recording processing unit 54 controls the main display 17 to display the manner mode temporal cancellation confirmation screen for temporarily canceling the manner mode. When the instruction of "Yes" is issued on the manner mode temporal cancellation confirmation screen, the processing is advanced to step S100, and the view recording processing unit 54 uses the audio volume value used for the view recording processing which is performed immediately before by the view recording processing unit 54 to perform the view recording processing of the broadcast wave received in the terrestrial digital one-segment broadcast wave receiver 47 via the main display 17 and the speaker 50.

With this configuration, even in a case where the manner mode is set, the cellular phone can prevent the user from missing the entire or a part of the broadcast program, and while the user realizes the timer activation of viewing or recording the terrestrial digital broadcast wave, it is possible to prevent missing view of the broadcast program based on the timer activation.

It should be noted that according to the embodiments of the present invention, the present invention is applied to the case of the timer view recording of the terrestrial digital one-segment broadcast wave. However, the present invention is not limited to the above-mentioned configuration, and, for example, the present invention can be applied to recording based on other systems, such as a case of recording the terrestrial digital broadcast wave and a case of recording the terrestrial digital three-segment radio broadcast wave.

In addition, the present invention is not limited to the biaxial turning type cellular phone 1. The present invention can also be applied to various cellular phones 1 such as a slide style cellular phone, a flip style cellular phone, and a straight style cellular phone.

It should be noted that in addition to the cellular phone 1, the present invention can be applied to other information processing apparatuses such as a PDA (Personal Digital Assistant), a personal computer, a portable game player, a portable music player, and a portable video player.

Also, the series of processings described according to the embodiment of the present invention can be executed by using software but also executed by using hardware.

Furthermore, according to the embodiments of the present invention, such a processing example has been described that the steps of the flowcharts are processed in a time series manner in the stated order, but the present invention also encompasses a processing in which the steps are not necessarily processed in the time series manner and the steps are processed in a parallel manner or individually processed.

What is claimed is:

1. An information processing apparatus, comprising:
a reception unit configured to receive a broadcast wave transmitted from a broadcast station;
a view processing unit configured to perform a view processing of the broadcast wave received by the reception unit;
a generation unit configured to generate an activation request for activating the view processing unit at a previously set timer view time or timer recording time by using a timer;
a timer view activation unit configured to activate the view processing unit on the basis of the activation request generated by the generation unit; and
a storage unit configured to store a timer view purpose audio volume value used for a timer view processing performed by the view processing unit,
wherein in the case of an activation caused by the timer view activation unit, the view processing unit performs the view processing of the broadcast wave with use of the timer view purpose audio volume value stored in the storage unit.

2. The information processing apparatus according to claim 1, wherein:
the storage unit further stores an audio volume value used in the view processing performed immediately before by the view processing unit; and
in the case of a view processing in accordance with a view activation operation, the view processing unit performs the view processing of the broadcast wave with use of the audio volume value used in the view processing performed immediately before which is stored in the storage unit.

3. The information processing apparatus according to claim 1, wherein in the case of the timer view processing, the view processing unit performs the view processing of the broadcast wave with use of a previously set timer view purpose audio volume value, and in the case of a timer processing, the view processing unit performs the view processing of the broadcast wave by using a previously set timer view purpose audio volume value, or muting the audio.

4. The information processing apparatus according to claim 2, wherein in the case of the timer view processing, the view processing unit performs the view processing of the broadcast wave with use of a previously set timer view purpose audio volume value, and in the case of a timer processing, the view processing unit performs the view processing of the broadcast wave by using a previously set timer view purpose audio volume value, or muting the audio.

5. The information processing apparatus according to claim 1, further comprising:
a setting unit configured to set a timer view purpose audio volume value used at the time of the timer view processing.

6. The information processing apparatus according to claim 2, further comprising:
a setting unit configured to set a timer view purpose audio volume value used at the time of the timer view processing.

7. The information processing apparatus according to claim 1, further comprising:
a sound collection unit configured to collect surrounding sound of the information processing apparatus; and
a decision unit configured to decide the timer view purpose audio volume value used at the time of the timer view processing on the basis of the surrounding sound of the information processing apparatus collected by the sound collection unit, with reference to a table in which surrounding sounds of the information processing apparatus are previously associated with timer view purpose audio volume values.

8. The information processing apparatus according to claim 7, further comprising:

an obtaining unit configured to obtain a light amount around the information processing apparatus, wherein the decision unit decides the timer view purpose audio volume value used at the time of the timer view processing on the basis of an electric signal corresponding to the light amount around the information processing apparatus obtained by the obtaining unit, with reference to a table in which light amounts around the information processing apparatus are previously associated with timer view purpose audio volume values.

9. The information processing apparatus according to claim 2, further comprising:

a sound collection unit configured to collect surrounding sound of the information processing apparatus; and a decision unit configured to decide the timer view purpose audio volume value used at the time of the timer view processing on the basis of the surrounding sound of the information processing apparatus collected by the sound collection unit, with reference to a table in which surrounding sounds of the information processing apparatus are previously associated with timer view purpose audio volume values.

10. The information processing apparatus according to claim 9, further comprising:

an obtaining unit configured to obtain a light amount around the information processing apparatus, wherein the decision unit decides the timer view purpose audio volume value used at the time of the timer view processing on the basis of an electric signal corresponding to the light amount around the information processing apparatus obtained by the obtaining unit, with reference to a table in which light amounts around the information processing apparatus are previously associated with timer view purpose audio volume values.

11. The information processing apparatus according to claim 1, wherein the view processing unit performs the view processing of the broadcast wave by increasing the audio volume value used at the time of the timer view processing stepwise from a start of the timer view processing for every predetermined period of time, with use of plural timer view purpose audio volume values set in advance.

12. The information processing apparatus according to claim 2, wherein the view processing unit performs the view processing of the broadcast wave by increasing the audio volume value used at the time of the timer view processing stepwise from a start of the timer view processing for every predetermined period of time, with use of plural timer view purpose audio volume values set in advance.

13. The information processing apparatus according to claim 1, further comprising:

a display unit configured to display an image along with the view processing by the view processing unit; and a state determination unit configured to determine a state of the information processing apparatus, wherein in a case where the state determination unit determines the state of the information processing apparatus as a state in which the display unit is exposed to an outside, the view processing unit performs the view processing of the broadcast wave with use of a first timer view purpose audio volume value, and in a case where the state determination unit determines the state of the information processing apparatus as a state in which the display unit is hidden inside, the view processing unit performs the view processing of the broadcast wave with use of a second timer view purpose audio volume value different from the first timer view purpose audio volume value.

14. The information processing apparatus according to claim 2, further comprising:

a display unit configured to display an image along with the view processing by the view processing unit; and a state determination unit configured to determine a state of the information processing apparatus, wherein in a case where the state determination unit determines the state of the information processing apparatus as a state in which the display unit is exposed to an outside, the view processing unit performs the view processing of the broadcast wave with use of a first timer view purpose audio volume value, and in a case where the state determination unit determines the state of the information processing apparatus as a state in which the display unit is hidden inside, the view processing unit performs the view processing of the broadcast wave with use of a second timer view purpose audio volume value different from the first timer view purpose audio volume value.

15. The information processing apparatus according to claim 1, further comprising:

an output unit configured to output audio along with the view processing by the view processing unit; and a state determination unit configured to determine a state of the information processing apparatus, wherein in a case where the state determination unit determines the state of the information processing apparatus as a state in which an audio outputting direction of the output unit faces outward, the view processing unit performs the view processing of the broadcast wave with use of a first timer view purpose audio volume value, and in a case where the state determination unit determines the state of the information processing apparatus as a state in which the audio outputting direction of the output unit faces inward, the view processing unit performs the view processing of the broadcast wave with use of a second timer view purpose audio volume value different from the first timer view purpose audio volume value.

16. The information processing apparatus according to claim 2, further comprising:

an output, unit configured to output audio along with the view processing by the view processing unit; and a state determination unit configured to determine a state of the information processing apparatus, wherein in a case where the state determination unit determines the state of the information processing apparatus as a state in which an audio outputting direction of the output unit faces outward, the view processing unit performs the view processing of the broadcast wave with use of a first timer view purpose audio volume value, and in a case where the state determination unit determines the state of the information processing apparatus as a state in which the audio outputting direction of the output unit faces inward, the view processing unit performs the view processing of the broadcast wave with use of a second timer view purpose audio volume value different from the first timer view purpose audio volume value.

17. The information processing apparatus according to claim 1, wherein in the case of the activation caused by the timer view activation unit, when a manner mode is set, the view processing unit sets the timer view purpose audio volume value used at the time of the timer view as a mute value to perform the view processing of the broadcast wave.

18. The information processing apparatus according to claim 17, wherein in the case of the view processing which follows the view activation operation, when the manner mode is set, the view processing unit accepts a canceling instruction on a manner mode temporal canceling confirmation screen, and the view processing unit performs the view processing of the broadcast wave with use of an audio volume value which is used in the view processing performed immediately before and which is stored in the storage unit.

19. The information processing apparatus according to claim 2, wherein in the case of the activation caused by the timer view activation unit, when a manner mode is set, the view processing unit sets the timer view purpose audio volume value used at the time of the timer view as a mute value to perform the view processing of the broadcast wave.

20. An information processing apparatus, comprising:
   a reception unit configured to receive a broadcast wave transmitted from a broadcast station;
   a display unit configured to display an image along with a view processing of the broadcast wave received by the reception unit;
   an output unit configured to output audio along with a view processing of the broadcast wave received by the reception unit;
   a generation unit configured to generate an activation request for activating the display unit and the output unit at a previously set timer view time or timer recording time by using a timer;
   a timer view activation unit configured to activate the display unit and the output unit on the basis of the activation request generated by the generation unit; and
   a storage unit configured to store a timer view purpose audio volume value used for a timer view processing,
   wherein in the case of an activation caused by the timer view activation unit, the output unit outputs audio along with a view processing of the broadcast wave with use of the timer view purpose audio volume value stored in the storage unit.

* * * * *